US007205046B2

(12) United States Patent
Kobayashi et al.

(10) Patent No.: US 7,205,046 B2
(45) **Date of Patent: *Apr. 17, 2007**

(54) ELECTROPHOTOGRAPHIC LAMINATION FILM, A METHOD OF PRODUCING THE SAME, AND A METHOD OF FORMING AN IMAGE

(75) Inventors: Tomoo Kobayashi, Minamiashigara (JP); Kunio Sakurai, Minamiashigara (JP); Kaoru Torikoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/345,235

(22) Filed: Jan. 16, 2003

(65) Prior Publication Data

US 2003/0224169 A1 Dec. 4, 2003

(30) Foreign Application Priority Data

Jun. 4, 2002 (JP) ............................ 2002-162654

(51) Int. Cl.
*B32B 27/36* (2006.01)
*G03G 13/00* (2006.01)
*G03G 15/00* (2006.01)
*G03G 15/04* (2006.01)
*G03G 15/14* (2006.01)

(52) U.S. Cl. ...................... 428/343; 428/195; 428/347; 428/349; 428/480; 430/18; 430/48; 430/97; 430/104; 430/105; 430/124; 399/130; 399/297; 399/308; 399/310; 399/342

(58) Field of Classification Search .................... None
See application file for complete search history.

(56) References Cited

U.S. PATENT DOCUMENTS 4,071,362 A * 1/1978 Takenaka et al. ........... 430/126
4,480,003 A 10/1984 Edwards et al.
4,529,650 A 7/1985 Martinez
4,783,376 A * 11/1988 Sakaki et al. ............... 428/511

(Continued)

FOREIGN PATENT DOCUMENTS

DE A1-26 44 089 4/1978

(Continued)

OTHER PUBLICATIONS

English language version of Chinese Office Action.

*Primary Examiner*—Vivian Chen
(74) *Attorney, Agent, or Firm*—Oliff & Berridge, PLC

(57) ABSTRACT

The present invention provides an electrophotographic lamination film which can be easily laminated by using the film as it is without significantly modifying a conventional electrophotographic device, can be printed with letters of high resolution directly on a surface of the film capable of softening at relatively low temperatures, and can form an image of high quality having sufficient heat resistance and light resistance with good recognizability even in outdoor use, as well as a method of producing the same and a method of forming an image. In the electrophotographic lamination film, a surface resistance of at least one surface of a substrate thereof is in a range of $10^8$ to $10^{13}$ Ω/□, and a Vicat softening temperature of the substrate is in a range of 70 to 130° C.

20 Claims, 1 Drawing Sheet

U.S. PATENT DOCUMENTS

| | | | | |
|---|---|---|---|---|
| 4,868,632 | A | 9/1989 | Hayashi et al. | |
| 4,973,141 | A | 11/1990 | Baucke et al. | |
| 5,104,731 | A | 4/1992 | Gager | |
| 5,378,576 | A | 1/1995 | Sakai et al. | |
| 5,437,913 | A * | 8/1995 | Asaka et al. | 428/195.1 |
| 5,731,116 | A | 3/1998 | Matsuo et al. | |
| 6,051,305 | A | 4/2000 | Hsu | |
| 6,074,066 | A | 6/2000 | Macher et al. | |
| 6,350,522 | B1 | 2/2002 | Kyu-seok et al. | |
| 6,395,387 | B1 | 5/2002 | Mochizuki | |
| 6,444,383 | B2 * | 9/2002 | Ikeuchi et al. | 430/42 |
| 6,524,760 | B1 * | 2/2003 | Ikeuchi et al. | 430/41 |
| 6,534,154 | B1 * | 3/2003 | Hayashi et al. | 428/212 |
| 6,656,649 | B1 * | 12/2003 | Ohishi et al. | 430/56 |
| 6,723,444 | B2 * | 4/2004 | Kobayashi et al. | 428/480 |
| 7,052,817 | B2 * | 5/2006 | Sakurai et al. | 430/124 |
| 7,070,680 | B2 | 7/2006 | Kobayashi et al. | |
| 7,070,860 | B2 * | 7/2006 | Kobayashi et al. | 428/412 |
| 2001/0044031 | A1 | 11/2001 | Ikeuchi et al. | |
| 2002/0168579 | A1 * | 11/2002 | Suzuki et al. | 430/7 |
| 2002/0182520 | A1 * | 12/2002 | Torikoshi | 430/18 |
| 2004/0126690 | A1 | 7/2004 | Kobayashi et al. | |
| 2004/0161690 | A1 * | 8/2004 | Sakurai et al. | 430/124 |

FOREIGN PATENT DOCUMENTS

| | | |
|---|---|---|
| EP | 0 104 074 A2 | 3/1984 |
| EP | 0 474 278 A1 | 3/1992 |
| EP | 0557989 | 10/1996 |
| EP | A1-0 969 330 | 1/2000 |
| EP | 1 022 618 A1 | 7/2000 |
| GB | 1 423 403 | 2/1976 |
| JP | A 58-102245 | 6/1983 |
| JP | 61-239230 | 10/1986 |
| JP | 04-125567 | 4/1992 |
| JP | A 5-98050 | 4/1993 |
| JP | 06-194858 | 7/1994 |
| JP | A 7-89209 | 4/1995 |
| JP | 07-164657 | 6/1995 |
| JP | 07-209895 | 8/1995 |
| JP | A 7-266723 | 10/1995 |
| JP | 07-306541 | 11/1995 |
| JP | 07-333882 | 12/1995 |
| JP | 08-509071 | 9/1996 |
| JP | 09-076648 | 3/1997 |
| JP | A 10-086562 | 4/1998 |
| JP | A-11-065156 | 3/1999 |
| JP | A 11-334265 | 12/1999 |
| JP | A-11-334297 | 12/1999 |
| JP | A 2001-092255 | 4/2001 |
| WO | WO 93/21557 | 10/1993 |
| WO | WO 94/22667 | 10/1994 |
| WO | WO 98/04960 | 2/1998 |

* cited by examiner

ELECTROPHOTOGRAPHIC LAMINATION FILM, A METHOD OF PRODUCING THE SAME, AND A METHOD OF FORMING AN IMAGE

BACKGROUND OF THE INVENTION

1. Field of Invention

The invention relates to an electrophotographic lamination film having an image formed (recorded) directly with an image-forming device in an electrophotographic system, and in particular to an electrophotographic lamination film used in non-contact or contact type information media containing personal information and images, such as cash cards, employee identification cards, student identification cards, membership cards, resident identification cards, various kinds of driver's licenses and various kinds of certificates containing face photographs, and sheets with images for identification, image displaying plates and indication labels used in the medical field etc.

2. Description of Related Art

As image-forming techniques have been developed in recent years, a method of forming images having identical qualities inexpensively in large amounts by various printing methods such as intaglio printing, letterpress printing, planographic printing, gravure printing and screen printing is known. Such printing methods are used often in printing of the surface of information media capable of storing predetermined information and communicating with external devices contacting or not contacting therewith, such as IC cards, magnetic cards, optical cards, and cards as a combination thereof.

However, the screen printing requires many printing plates in accordance with the number of images to be printed, and color printing requires additional printing plates in accordance with the number of colors. Accordingly, these printing methods are not suitable for dealing with information for personal identification (face photograph, name, address, date of birth, various kinds of licenses).

To solve the problem, image-forming means used mainly at present is a method of forming an image with e.g. a printer in a sublimation-type or fusion-type thermal transfer system using an ink ribbon etc. The method can easily print information for personal identification, but there remain problems such as lower resolution at a higher printing speed and a lower printing speed in higher resolution.

On the other hand, formation (printing) of an image in the electrophotographic system is conducted by charging the surface of an image carrier uniformly and exposing it to light depending on an image signal, to form an electrostatic latent image by a potential difference between a light-exposed portion and a non-exposed portion, followed by electrostatic development of a color powder (image forming material) called as a toner having polarity opposite to (or identical with) the charge thereby forming a visualized image (toner image) on the surface of the image carrier. In the case of color images, the process is repeatedly carried out or a plurality of image-forming devices are arranged thereby forming visible color images which are then transferred and fixed (fixing by mainly thermally melting and cooling the color powder) to an image recording material to give color images.

As described above, the electrostatic latent image on the surface of the image carrier is electrically formed using an image signal in the electrophotographic system, thus permitting not only the same image to be repeatedly formed but also different image to be easily formed. Further, the toner image on the surface of the image carrier can be transferred almost completely to the surface of the image recording material, and the toner image slightly remaining on the surface of the image carrier can be easily removed by a resin blade or a blush, and thus printed materials can be produced easily in a small number of different forms.

The toner is formed usually by melt-mixing additives such as hot-melt resin, a pigment and if necessary a charging regulator and pulverizing the mixture through milling. As compared with the pulverized toner, the electrostatic latent image in the electrophotographic system has sufficiently high resolution, and can be expected to have sufficiently higher resolution than in screen printing or in the thermal transfer system using an ink ribbon.

With respect to color images, the color toner has four primary colors of cyan, magenta, yellow and black, and by mixing these colors, any colors theoretically identical to those in printing can be realized. Further, the color toner can be relatively freely blended with a toner resin and a pigment, and thus the shielding of an image by the toner can be easily increased.

There is no or less examination of heat resistance and light resistance assuming that the image-recording material is used outdoors, but when driver's licenses etc. are placed particularly under sunrays in cars, thermal transfer-type images using dyes as coloring matter are faded. In the output of color images in the electrophotographic system, however, pigments excellent in light resistance, corresponding to the respective colors of cyan, magenta, yellow and black, are used in the color toner, so the image recording material in the electrophotographic system can be expected to be highly light resistant. When a heat-resistant toner is selected, the image recording material can also be endowed with heat resistance to such an extent as to be usable outdoors.

On the other hand, the substrate (core) in various cards used widely at present is a vinyl chloride sheet because it is excellent not only in printing characteristics but also in embossing processability (treatment of making letters etc. uneven). However, the vinyl chloride sheet has a problem of generation of dioxin by combustion in a heating oven upon disposal after use, and from an environmental point of view, various kinds of sheet films came to be used as those free of vinyl chloride.

Assuming that embossing is not conducted, preexisting biaxially oriented PET (polyethylene terephthalate) film or the like can be used. However, embossing is often indispensable for keeping the functions of cards, and at present, ABS resin film softening at a relatively low temperature, polyolefin resin film, modified PET resin film called PETG, or a film where modified PET resin film and PET film or amorphous PET resin film or polycarbonate resin film have been integrally molded, came to be used.

Examples of printing on various kinds of cards using the above-described electrophotographic device are as follows:

For example, Japanese Patent Application Laid-Open (JP-A No.) No. 2001-92255 discloses a method in which invisible bar codes in addition to various kinds of personal information are printed on a vinyl chloride sheet of 250 μm in thickness or a polyester sheet of 280 μm in thickness by an electrophotographic method, and an over-film is layered on the printed surface and laminated by a heat pressing machine.

However, the above-described sheets have a high coefficient of friction so that they adhere to each other to dete riorate sheet transferability to stop the electrophotographic device, while the above-described insulating material (sheet) of 250 μm or more in thickness is liable to increase image defects because of insufficient transfer of an image forming material (toner) thereto. Further, when the resin film softening at a relatively low temperature is used for printing with an electrophotographic device, the film is made viscous because the fixing temperature of the toner in the fixing step is higher than the softening temperature of the resin, thus causing a problem of sticking of the film to the fixing device to generate jams. Further, the image forming material causes offset in the fixing device, and when fixation of the above sheet of 250 μm in thickness is continued, the fixing device may be damaged considerably by the edge (corner) of the sheet.

Further, JP-A No. 11-334265 describes that a light-permeable sheet is printed with a mirror image of information for personal identification. With respect to the light-permeable laminated sheet, however, it is merely described that a part of the laminated sheet is preferably a biaxially oriented polyester film or a film made of ABS or polyester/biaxially oriented polyester film, but may be vinyl chloride.

However, the film according to JP-A No. 11-334265 supra is merely an insulating material to undergo insufficient transfer of the image forming material to the surface of the film, thus failing to achieve the same resolution as in the thermal transfer system. Further, the laminated sheet used in the device emphasizing improvements in productivity is in a rolled shape, so there is a problem of much loss and iste in the case of emergent production or in production of many kinds of cards, for example in printing of different cards for one to several persons.

SUMMARY OF THE INVENTION

The object of the present invention is to solve the problems in the prior art described above.

That is, the object of the invention is to provide an electrophotographic lamination film which can be easily laminated by using the film as it is without significantly modifying a conventional electrophotographic device, can be printed with letters of high resolution directly on the surface of the film capable of softening at relatively low temperatures, and can form an image of high qualities having sufficient light resistance with good recognizability even in outdoor use, as well as a method of producing the same and a method of forming an image.

As a result of extensive study, the inventors found that the object can be achieved by forming a mirror image on a transparent substrate suitable as a laminate with a coating layer of regulated surface resistance formed thereon, such that when the image is viewed through the substrate, the image is seen as a normal image at the other surface of the substrate than where the image has been formed.

Further, a function-regulating layer is formed on the other surface of the substrate than where the image is formed, thus permitting the surface thereof as a card to be subjected to various kinds of processing. Further, the resin used in the coating layer on the surface of the film is a polyester resin, and the layer contains fillers, whereby the coefficient of friction between films can be lowered to improve transferability. Light resistance is also improved by adding a UV ray absorber and an antioxidant. For environmental measures, chlorine-free resin film is used as the substrate, and as a printing method compatible therewith, a method of fixing an image has been considered.

That is, the invention is as follows.

According to the first aspect of the invention, the invention is an electrophotographic lamination film comprising a substrate, wherein a surface resistance of at least one surface of the substrate is in a range of $10^8$ to $10^{13}$ Ω/cm$^2$, and a Vicat softening temperature of the substrate is in a range of 70 to 130° C.

According to the second aspect of the invention, the invention is an electrophotographic lamination film comprising function-regulating means disposed on a surface of the substrate opposite a surface of the substrate at which an image is formed, wherein the function-regulating means has at least one function selected from regulating gloss, light resistance, microbial resistance, flame retardancy, releasability and chargeability.

According to the third aspect of the invention, the invention is an electrophotographic lamination film, wherein the substrate is transparent.

According to the fourth aspect of the invention, the invention is an electrophotographic lamination film, wherein the substrate comprises a resin having a chlorine-free resin as a main component thereof.

According to the fifth aspect of the invention the invention is an electrophotographic lamination film comprising a substrate and at least one coating layer disposed on a surface of the substrate, wherein a surface resistance of at least an outermost surface of the at least one coating layer is in a range of $10^8$ to $10^{13}$ Ω/cm$^2$, and a Vicat softening temperature of the substrate is in a range of 70 to 130° C.

According to the sixth aspect of the invention, the invention is an electrophotographic lamination film, wherein the at least one coating layer comprises an image-receiving layer containing a resin and fillers.

According to the seventh aspect of the invention, the invention is an electrophotographic lamination film, wherein the resin contained in the image-receiving layer is a polyester resin.

According to another aspect of the invention, the invention is an electrophotographic lamination film, wherein the at least one coating layer contains at least one selected from the group consisting of a charging regulator, an antimicrobial agent, a UV ray absorber and an antioxidant.

According to another aspect of the invention, the invention is electrophotographic lamination film, wherein the substrate comprises a resin having a chlorine free resin as a main component thereof According to another aspect of the invention, the invention is a method of producing an electrophotographic lamination film by using a coating solution to form at least one of a coating layer and function-regulating means on a surface of a substrate, wherein a solvent used in the coating solution is a good solvent for the surface of the substrate, and the at least one of a coating layer and a function-regulating layer is formed while the surface of the substrate is dissolved.

According to another aspect of the invention, the invention is a method of forming an image by using an electrophotographic lamination film in which a surface resistance of at least one surface of a substrate is in a range of $10^8$ to $10^{13}$ Ω/cm$^2$ and a Vicat softening temperature of the substrate is in a range of 70 to 130° C., wherein a toner image formed on a surface of the electrophotographic lamination film is formed as a mirror image such that an image-forming surface is a laminated surface.

According to another aspect of the invention, the invention is a method of forming an image, wherein fixation of the toner image formed on the surface of the electrophotographic lamination film is conducted such that a temperature of the surface of the electrophotographic lamination film is 130° C. or less.

According to another aspect of the invention, the invention is a method of forming an image by using an electrophotographic lamination film comprising a substrate and at least one coating layer disposed on a surface of substrate wherein a surface resistance of at least an outermost surface of the at least one coating layer is in a range of $10^8$ to $10^{13}$ $\Omega/cm^2$ and a Vicat softening temperature of the substrate is in a range of 70 to 130° C., and wherein a toner image formed on a surface of the electrophotographic lamination film is formed as a mirror image such that an image-forming surface is a laminated surface.

According to another aspect of the invention, the invention is an image forming device comprising an electrophotographic photoreceptor, a charging unit for charging the photoreceptor, a latent image-forming device for forming an electrostatic latent image on the charged photoreceptor, a development device for developing the latent image with a toner, and a transfer device for transferring the toner image formed on the photoreceptor onto a recording medium, wherein the recording medium is an electrophotographic lamination film in which a surface resistance of at least one surface of a substrate is in a range of $10^8$ to $10^{13}$ $\Omega/cm^2$ and a Vicat softening temperature of the substrate is in a range of 70 to 130° C., and wherein the toner image formed on a surface of the electrophotographic lamination film is formed as a mirror image such that an image-forming surface is a laminated surface.

According to another aspect of the invention, the invention is an image forming device comprising an electrophotographic photoreceptor, a charging unit for charging the photoreceptor, a latent image-forming device for forming an electrostatic latent image on the charged photoreceptor, a development device for developing the latent image with a toner, and a transfer device for transferring the toner image formed on the photoreceptor onto a recording medium, wherein the recording medium is an electrophotographic lamination film comprising a substrate and at least one coating layer disposed on a surface of the substrate wherein a surface resistance of at least an outermost surface of the at least one coating layer is in a range of $10^8$ to $10^{13}$ $\Omega/cm^2$ and a Vicat softening temperature of the substrate is in a range of 70 to 130° C., and wherein the toner image formed on a surface of the electrophotographic lamination film is formed as a mirror image such that an image-forming surface is a laminated surface.

DETAILED DESCRIPTION OF PREFERRED EMBODIMENTS

Figure 1:
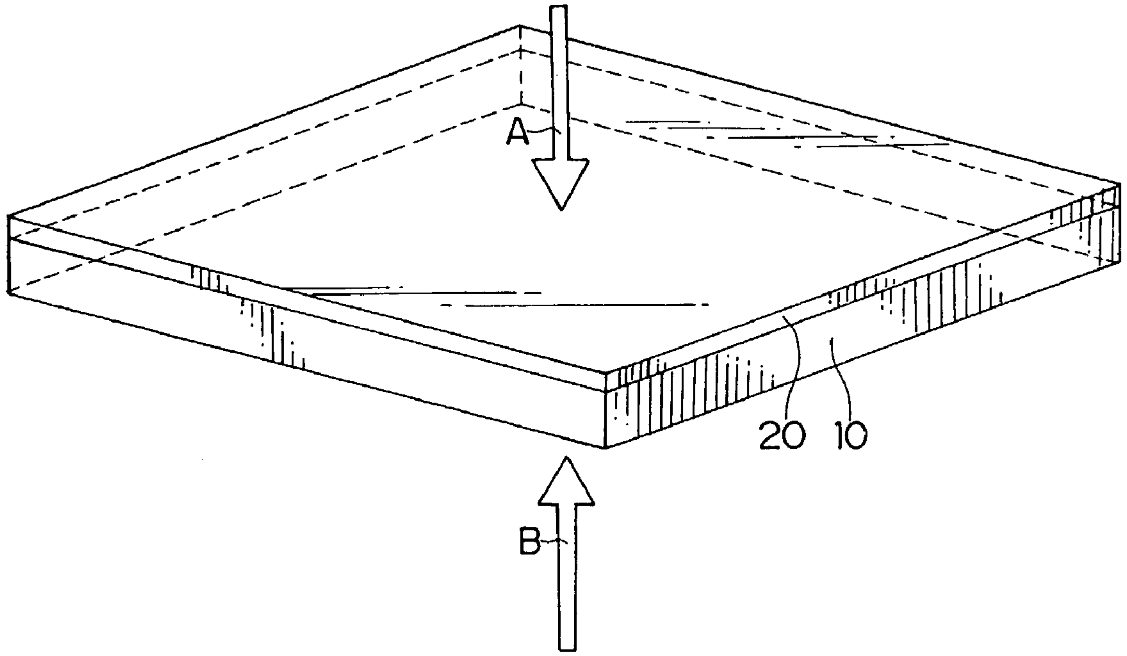
FIG. 1 is a perspective view schematically showing one example of the electrophotographic lamination film of the present invention.

Hereinafter, the electrophotographic lamination film of the present invention is described in more detail by reference to the drawing.

FIG. 1 is a perspective view schematically showing one example of the electrophotographic lamination film of the invention. As shown in FIG. 1, the image recording material of the invention is composed of a substrate 10, function-regulating means 20. If necessary, a coating layer (image-receiving layer) not shown in the drawing may be arranged on the surface of the substrate 10 where the function-regulating means 20 is not formed. In FIG. 1, the function-regulating means 20 is shown to have a layered structure, but is not limited to this shape, and the surface of the substrate 10 may be provided directly with the function-regulating means 20 by mechanical treatment.

The electrophotographic lamination film of the invention has a structure wherein a reverse image (mirror image) is formed on one surface of the substrate 10 having transparency such that when the image is viewed through the substrate 10, the image is seen as a normal image at the other surface of the substrate 10 than where the image is formed, while the surface where the image is not formed is provided with the regulation-regulating means 20. That is, as shown in FIG. 1, the image is formed at the surface indicated by the arrow B, while a gloss-regulating means (function-regulating means 20) is arranged on the surface indicated by the arrow A. According to the electrophotographic lamination film, the surface of the image on which the image is formed is different from the surface on which the gloss-regulating means is arranged, and thus various functions can be regulated simultaneously without adversely affecting the qualities of the formed image.

The substrate 10 usable in the electrophotographic lamination film of the invention desirably has transparency. As used herein, the term "transparency" refers for example to a property permitting a light in the visible light range to penetrate to a certain degree, and in the invention, an formed image may be transparent at least to such a degree as to be observed through the substrate 10.

As the substrate 10, a plastic film is typically used. In particular, a light-permeable film usable as OHP film, for example, a polyacetate film, triacetate cellulose film, nylon film, polyester film, polycarbonate film, polystyrene film, polyphenylene sulfide film, polypropylene film, polyimide film, cellophane and ABS (acrylonitrile-butadiene-styrene) resin film can be preferably used.

Among these plastic films, a polyester film particularly a polyester called PETG wherein about half of the ethylene glycol component in PET (polyethylene terephthalate) has been replaced by a 1,4-cyclohexane methanol component, a polyester alloyed by mixing a polycarbonate with PET, or an amorphous polyester called A-PET that is PET not subjected to biaxial stretching can be used more preferably.

The materials such as polyesters can be substituted for polyvinyl chloride used conventionally as a substrate (core) material in cards but recently not used owing to the awareness of its generation, upon combustion, of dioxin detrimental to the environment. By considering the use of the chlorine-free substrate in the invention, further materials for example, films comprising a hot-melt adhesive such as polyester or EVA added to the above polystyrene type resin film, ABS resin film, AS (acrylonitrile-styrene) resin film, PET film, or to polyolefin type resin film of polyethylene, polypropylene etc. can also be preferably used.

The Vicat softening temperature of the substrate 10 used in the electrophotographic lamination film in the invention should be in a range of 70 to 130° C., more preferably in a range of 80 to 120° C.

When the Vicat softening temperature is less than 70° C., the lamination film may not sufficiently adhere to the substrate (core) in the lamination step. On the other hand, when the Vicat softening temperature is higher than 130° C., the adhesion can be made sufficient, but an image (image forming material) or a coating layer described later may be made too soft, thus generating defects (image flow) in the image.

The Vicat softening temperature is measured by one of methods of evaluating the softening temperature of a thermoplastic resin, and the measuring method is stipulated as a method of measuring the heat resistance of a molded plastic material as thermoplastic resin in JIS K7206, ASTM D1525 or ISO306.

In the invention, a test specimen of 2.5 mm in thickness is used, and a needle-shaped indenter with a sectional area of 1 $mm^2$ is set on the surface of the test specimen, and 1 kg loading is placed on the indenter, and the temperature of an oil bath for heating the test specimen is gradually increased, and the oil temperature at which the indenter penetrated the test specimen to a depth of 1 mm is regarded as Vicat softening temperature.

The surface resistance of at least one surface of the substrate 10 used in the electrophotographic lamination film of the invention should be in a range of $10^8$ to $10^{13}$ $\Omega/cm^2$, preferably in a range of $10^9$ to $10^{11}$ $\Omega/cm^2$.

When the surface resistance is less than $10^8$ $\Omega/cm^2$, the resistance of the image recording material becomes too low at high temperatures under high humidity, and for example, a toner transferred from a transfer member may be disturbed, while when the surface resistance is higher than $10^{13}$ $\Omega/cm^2$, the resistance of the lamination film used as an image recording material becomes too high, and for example a toner from the transfer member cannot be transferred to the surface of the film, to generate image defects due to imperfect transfer.

The surface resistance can be measured according to JIS K6991 by using a circular electrode (for example, Highrester IP "HR probe" manufactured by Mitsubishi Petrochemical Co., Ltd.) in an environment at 23° C. under 55% RH.

When only one surface of the electrophotographic lamination film has surface resistance in the range described above, the surface is preferably a surface on which an image is formed.

The surface resistance of at least one surface of the substrate 10 can be regulated in a range of $10^8$ to $10^{13}$ $\Omega/cm^2$ by directly adding a surfactant, a polymer electroconductive agent or fine electroconductive particles to the resin at the time of production of a film as substrate 10, or by coating the surface of the film with a surfactant or depositing a metal film thereon, or adding a suitable amount of a surfactant to an adhesive etc.

The surfactant includes, for example, cationic surfactants such as polyamines, ammonium salts, sulfonium salts, phosphonium salts and betaine type amphoteric salts, anionic surfactants such as alkyl phosphates and nonionic surfactants such as fatty esters. Among these surfactants, cationic surfactants interacting highly with the recent electrophotographic negatively charged toners are effective for improving transferability.

Among these cationic surfactants, quaternary ammonium salts are preferable. The quaternary ammonium salts are preferably compounds represented by the general formula (I):

(I)

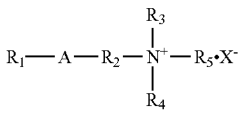

In the formula, $R^1$ represents a $C_{6-22}$ alkyl group, alkenyl group or alkynyl group, $R^2$ represents a $C_{1-6}$ alkyl group, alkenyl group or alkynyl group. $R^3$, $R^4$ and $R^5$ represent the same or different aliphatic group, aromatic group or heterocyclic group. The aliphatic group refers to a linear, branched or cyclic alkyl group, alkenyl group and alkynyl group. The aromatic group represents a single benzene ring, condensed or polycyclic aryl group. These groups may have a substituent group such as hydroxyl group. A represents an amide linkage, ether linkage, ester linkage or phenyl group, but may be absent. $X^-$ represents a halogen ion, sulfate ion or nitrate ion, each of which may have a substituent group.

As the substrate 10, other resin having transparency or ceramics having transparency can be used in addition to the plastic film described above, and these may be colored by adding a pigment, dye etc. Further, the substrate 10 may be in the form of a film or plate, and may be shaped to have thickness to such an extent as not to have flexibility or to have strength necessary for the substrate 10.

Preferably the function-regulating means 20 has at least one function selected from functions of regulating gloss, light resistance, microbial resistance, flame retardancy, releasability and chargeability, and is arranged specifically for conferring and/or improving various functions such as gloss, light resistance, microbial resistance, flame retardancy, releasability and chargeability, further preferably moisture resistance, heat resistance, water repellency, abrasion resistance and mar resistance on the surface of the substrate 10. The electrophotographic lamination film having the function-regulating means 20 can thereby have resistance under various conditions.

Hereinafter, the function-regulating means 20 for regulating gloss is described specifically, which however is not intended to limit the invention.

The regulation of gloss is conducted so as to prevent the "glittering" of an image formed on the image surface of the substrate 10, to improve visual recognizability when viewed in any directions. The function-regulating means 20 for regulating gloss may be composed of a gloss-regulating layer provided on the regulating surface of the substrate 10, for example as shown in FIG. 1, or the regulating surface of the substrate 10 may be subjected directly to mechanical treatment for regulating gloss to confer a gloss-regulating function on the substrate 10.

As the method of subjecting the surface of the substrate 10 directly to mechanical treatment for regulating gloss, there is a method of providing the surface of the substrate 10 with unevenness by a mechanical means. Once the surface of the substrate 10 is provided with unevenness of 3 to 30 μm in depth, light scattering occurs on the surface of the substrate, and the treatment for desired gloss can be conducted by changing the size, roughness and depth of unevenness. As the mechanical means, known methods of mechanical surface treatment, such as sandblasting, embossing, plasma etching etc. can be used.

Sandblasting is a method of roughing the surface of a material by blasting the surface successively with abrasive grains of indefinite or definite shape, such as organic resin, ceramics and metal. Embossing is a method wherein a material is contacted with a mold previously provided with unevenness, to transfer the unevenness of the mold to the surface of the material. Plasma etching is a method of etching with excited molecules, radicals and ions generated by dissociation of molecules with plasma discharge. The etching proceeds through evaporation of a vaporizable compound formed by reaction of the resultant excited species with a material.

When the function-regulating means 20 for regulating gloss is constituted as a gloss-regulating layer, the gloss-regulating layer can be formed by utilizing the phase separation of the polymer. The resin forming the gloss-regulating layer is allowed to incorporate a resin incompatible therewith to generate phase separation during drying thereby providing the surface of the layer with unevenness. By regulating the type, amount of the incompatible resin and drying conditions, the state of phase separation can be changed, whereby the unevenness on the surface of the layer can be regulated, and as a result, the gloss of the regulating surface can be regulated.

In another embodiment wherein the function-regulating means 20 for regulating gloss is constituted as a gloss-regulating layer, the gloss-regulating layer may be composed at least of a binder and fillers. The binder contained in the gloss-regulating layer can make use of a resin. This resin is composed preferably of the hot-melt resin used in the image forming material (toner) from the viewpoint of affinity for the substrate, selection from a diversity of materials, stability, costs, and easiness of the process. The thickness of the gloss-regulating layer is preferably in a range of 0.01 to 20 μm for stability in formation of the coating, more preferably in a range of 0.1 to 5 μm for stable inclusion of fillers and for securing adhesion to the substrate.

The hot-melt resin used in the layer as the function-regulating means 20 or in a coating layer described later is not particularly limited insofar as it is used as an image forming material, and examples thereof include homopolymers or copolymers obtained by polymerizing one or more monomers, for example styrene or styrene derivatives such as vinyl styrene and chlorostyrene; monoolefins such as ethylene, propylene, butylene and isobutylene; vinyl esters such as vinyl acetate, vinyl propionate, vinyl benzoate and vinyl butyrate; α-unsaturated fatty monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; vinyl ketones such as vinyl methyl ketone, vinyl hexyl ketone and vinyl isopropenyl ketone; diene type monomers such as isoprene and 2-chlorobutadiene.

Among these monomers, styrene or derivatives thereof, α-unsaturated fatty monocarboxylates are preferably used.

As the thermoplastic resin usable in the invention, the polyester resin, polyurethane resin etc. can also be used alone or as a mixture thereof.

The polyester can be produced by reacting a polyvalent hydroxy compound with a polybasic carboxylic acid or a reactive acid derivative thereof. The polyvalent hydroxy compound constituting the polyester includes, for example, diols such as ethylene glycol, diethylene glycol, triethylene glycol, 1,2-propylene glycol, 1,3-propylene glycol, neopentyl glycol and 1,4-butane diol; bisphenol A alkylene oxide adducts such as hydrogenated bisphenol A, polyoxyethylenated bisphenol A and polyoxypropylenated bisphenol A; and other divalent alcohols and divalent phenols such as bisphenol A.

The polybasic carboxylic acid includes, for example, malonic acid, succinic acid, adipic acid, sebacic acid, alkyl succinic acid, maleic acid, fumaric acid, mesaconic acid, citraconic acid, itaconic acid, glutaconic acid, cyclohexane dicarboxylic acid, phthalic acid (isophthalic acid, terephthalic acid), other divalent carboxylic acids, or reactive acid derivatives thereof such as acid anhydrides, alkyl esters and acid halides. In addition to these divalent hydroxy compounds and carboxylic acids, polyvalent (trivalent or more) hydroxyl compounds and/or polybasic (tribasicor more) carboxylic acids may be added for non-linearization of the resultant thermoplastic resin to such an extent as not to form insoluble tetrahydroxy furan.

Particularly preferable among those described above is a linear saturated polyester resin produced by polycondensat ion of phthalic acid as a divalent carboxylic acid with ethylene glycol and neopentyl glycol as polyvalent hydroxy compounds in a predetermined ratio. The linear saturated polyester resin is desirably the one produced by polymerization, in a ratio of about 1:1, of divalent carboxylic acids consisting of terephthalic acid and isophthalic acid in a molar ratio of about 1:1 with polyvalent hydroxy compounds consisting of ethylene glycol and neopentyl glycol in the molar ratio of from 7:3 to 1:9.

The resin constituting the gloss-regulating layer may be composed of a hardening resin such as heat-curable resin, photo-curable resin or electron radiation curable resin in order to improve the strength of its coating.

The heat-curable resin includes known resins to be cured (insolubilized) usually upon heating. Examples thereof include a phenol-formaldehyde resin, an urea-formaldehyde resin, a melamine-formaldehyde resin, a resin of acryl polyol cured with an isocyanate, a resin of polyester polyol cured with melamine, and a resin of acrylic acid cured with melamine. Further, monomers that are elements of the heat-curable resin may be used in combination.

In addition, any thermoplastic resins cured by crosslinking and having heat resistance can be used as the heat-curable resin in the invention. As this kind of heat-curable resin, for example, a heat-curable acryl resin is preferably used. The heat-curable acryl resin is produced by crosslinking, with a melamine type compound or an isocyanate type compound, a copolymer prepared by polymerizing at least one kind of acrylic monomer, or an acrylic monomer with a styrene type monomer.

As the acrylic monomer, use can be made of, for example, alkyl methacrylate such as methyl methacrylate, butyl methacrylate, octyl methacrylate and stearyl methacrylate; alkyl acrylates such as ethyl acrylate, propyl acrylate, butyl acrylate and octyl acrylate; acrylonitrile; and vinyl monomers containing an amino group, such as acrylamide, dimethylaminoethyl methacrylate, diethylaminoethyl methacrylate, dimethylaminoethyl acrylate and dimethylaminopropyl methacrylamide, and as the styrene type monomer, use can be made of styrene, α-methylstyrene, vinyltoluene, p-ethylstyrene etc.

A curable silicone resin whose hardening is not limited to heat-curing can also be preferably used. Generally the silicone resin is classified, depending on the molecular structure, into silicone resin having a linear structure serving as a material of silicone oil and silicone rubber, and silicone resin having a three-dimensionally crosslinked structure. Various properties such as releasability, adhesion, heat resistance, insulation and chemical stability are determined by molecules (organic molecules) bound to the silicon atoms, the degree of polymerization, etc. The curable silicone resin usable in the invention is a silicone resin having a three-dimensionally crosslinked structure as described above. The silicone resin having a three-dimensionally crosslinked structure has a crosslinked structure which is polymerized usually from multifunctional (trifunctional, tetrafunctional) units.

The above silicone resin having a linear structure has a low molecular weight, and includes silicone oil utilized as an insulating oil, a liquid coupling agent, a buffering oil, a lubricating oil, a heating medium, a water repellant, a surface treating agent, a release agent or a deforming agent and silicone rubber having a molecular weight (siloxane unit) of about 5000 to 10000 polymerized by heat-curing in the presence of a vulcanizing agent etc., but these are not suitable as the curable silicone resin described above.

Depending on the molecular-weight unit, the curable silicone resin is classified into relatively lower-molecular silicone varnish soluble in an organic solvent, and highly polymerized silicone resin. Further, the curable silicone resin is also classified into condensation type, addition type and radiation type (UV-curable type, electron radiation curable type etc.), depending on the curing reaction in the forming stage. Further, the curable silicone resin is classified into solvent type, non-solvent type etc., depending on the application form.

The factors governing the curing reaction include the type of reactive group, the number of reactive groups, curing time, temperature, irradiation energy etc. The method of regulating the curing reaction includes, for example, a method of adding mono- or bifunctional polydimethyl siloxane, a reaction inhibitor (acetylene alcohols, cyclic methyl vinyl cyclosiloxane, siloxane-modified acetylene alcohols etc.) etc. or a method of regulating the amount of a catalyst, reaction temperature, reaction time, intensity of UV irradiation, etc. By regulating the curing reaction in this manner, the molecular weight of the curable silicone resin, the amount of remaining silanol as the reactive group, etc. can be regulated, and thus the releasability, hardness, adhesion, surface hardness, transparency, heat resistance, chemical stability etc. can be arbitrarily regulated.

At the stage of curing the curable silicone resin, strong bonding is formed between the substrate 10 and the curable silicone resin. Accordingly, the gloss-regulating layer formed on the surface of the substrate 10 has excellent adhesive strength to the substrate 10 and will thus not be released from the substrate 10.

The composition using the photo-curable resin described above includes, for example, a composition based on a compound (including not only a low-molecular compound but also a polymer) having a reactive double bond such as vinyl group in the molecule, an initiator necessary for photo-curing, a protective layer for the sublayer (coloring layer, or the substrate layer depending on the case), for example a UV ray absorber, and if necessary a sheet retention-improving polymer such as a resin.

The composition using the electron radiation curable resin is for example a composition based on a compound having a reactive double bond such as vinyl group in the molecule, a sublayer-protecting material (UV ray absorber) and if necessary a resin.

The compound having a reactive double bond in the molecule includes compounds having a (meth)acryloyl group, for example those of monofunctional type such as methyl (meth)acrylate, ethyl (meth)acrylate, benzyl (meth) acrylate, 2-ethoxyethyl (meth)acrylate and phenoxy diethylene glycol (meth)acrylate, and those of multifunctional type such as 1,6-hexanediol di(meth)acrylate, neopentyl glycol di(meth)acrylate, polyethylene glycol di(meth)acrylate, polypropylene glycol di(meth)acrylate, trimethylpropane tri(meth)acrylate, pentaerythritol tri(meth)acrylate, pentaerythritol tetra (meth) acrylate and dipentaerythritol-hexa(meth)acrylate. Further, oligomers such as polyester acrylate, polyurethane acrylate, polyepoxy acrylate, polyether acrylate, oligoacrylate, polyalkydacrylate, and polyol acrylate can also be mentioned. Furthermore, compounds having a vinyl group or allyl group, such as styrene monomer, a-methylstyrene, divinylstyrene, vinyl acetate, pentene, hexene, unsaturated compounds etc. can also be mentioned.

To improve the adhesion of the gloss-regulating layer or compatibility with the sublayer-protecting material, these compounds may have introduced polar groups such as hydroxyl group, amino group, carboxyl group, carbonyl group and epoxy group.

The photo-curable polymerization initiator is added for curing particularly with UV rays. This p photo-curable polymerization initiator is usually called a photo-initiator, and for example a photo-initiator based on benzoin alkyl ether, acetophenone, benzophenone or thioxanthone is preferably used. The benzoin ether-based initiator includes benzyl, benzoin, benzoin methyl ether, benzoin ethyl ether, benzoin propyl ether etc. The acetophenone-based initiator includes 2,2'-diethoxy acetophenone, 2-hydroxy-2-methyl propiophenone, p-tert-butyl trichloroacetophenone, 2,4,6-trimethylbenzoyldiphenyl phosphene oxide etc. The benzophenone-based initiator includes benzophenone, 4-chlorobenzophenone, 4,4'-dichlorobenzophenone, 3,3'-dimethyl-4-methoxy benzophenone, dibenzosuberenon etc. The thioxanthone-based initiator includes thioxanthone, 2-chlorothioxanthone, 2-methyl thioxanthone, 2-isopropyl thioxanthone, 2-ethyl anthraquinone etc.

The photo-initiator is added in a range of 0.05 to 10 parts by weight, preferably 0.1 to 5 parts by weight, based on 100 parts by weight of the compound having a reactive double bond. The photo-initiators may be used alone or in combination thereof.

As the sublayer-protecting material, a commercial UV ray absorber and the like can be used. The material to be added is selected from those excellent in dispersion stability in the composition without undergoing modification upon irradiation with light. The sublayer-protecting material includes organic materials, for example, salicylate type materials such as phenyl salicylate, p-tert-butyl phenyl salicylate and p-octyl phenyl salicylate; benzophenone type materials such as 2,4-dihydroxybenzophenone, 2-hydroxy-4-methoxy benzophenone, 2-hydroxy-4-octoxy benzophenone and 2-hydroxy-4-dodecyloxy benzophenone; benzotriazole type materials such as 2-(2'-hydroxy-5'-methylphenyl) 2H-benzotriazole, 2-(2'-hydroxy-5'-tert-butylphenyl) benzotriazole and 2-(2'-hydroxy-3'-tert-butyl-5'-methylphenyl)-5-chlorobenzotriazole; and cyanoacrylate type materials such as 2-ethylhexyl-2-cyano-3,3'-diphenyl acrylate and ethyl-2-cyano-3,3'-diphenyl acrylate.

Further, the sublayer-protecting material includes inorganic materials such as fine particles of oxides such as zinc oxide and titanium oxide and fine particle of other metal oxides such as iron oxide and cerium oxide.

The UV ray absorber is particularly preferably the organic material described above, and added in a range of 0.01 to 40 parts by weight, preferably 0.1 to 25 parts by weight, based on 100 parts by a weight of the compound having reactive double bond. Further, it is more preferable to use two or more UV ray absorbers than a single absorber in order to improve protection of the sublayer.

Further, a hindered amine-based light stabilizer and an antioxidant is also preferably added depending on the case.

As another light resistant material for protection of the sublayer, a commercial antioxidant and the like can be used. Like the UV ray absorber, the material to be added is selected from those excellent in dispersion stability in the composition without undergoing modification upon irradiation with light. Examples thereof include phosphate type antioxidants, sulfur type antioxidants, phenol type antioxidants, hindered amine antioxidants etc.

Examples of the phosphate type antioxidants include phosphite compounds such as trimethyl phosphite, triethyl phosphite, tri-n-butyl phosphite, trioctyl phosphite, tridecyl phosphite, tristearyl phosphite, trioleyl phosphite, tristridecyl phosphite, tricetyl phosphite, dilaurylhydrodiene phosphite, diphenylmonodecyl phosphite, diphenylmono(tridecyl)phosphite, tetraphenyldipropyleneglycol diphosphite, 4,4'-butylidene-bis[3-methyl-6-t-(butyl)phenyl-di-tridecyl] phosphite, distearylpentaerythritol diphosphite, ditridecylpentaerythritol diphosphite, bisnonylphenylpentaerythritol diphosphite, diphenyloctyl phosphite, tetra(tridecyl)-4,4'-isopropylidenediphenyl diphosphite, tris(2,4-di-t-butylphenyl)phosphite and di(2,4-di-t-butylphenyl)pentaerythritol diphosphite.

As the phosphate type antioxidants, any known trivalent organic phosphorus compounds can be used, and for example those described in Japanese Patent Application Publication (JP-B) Nos. 51-40589, 51-25064, 50-35097, 49-20928, 48-22330 and 51-35193 can also be used.

The sulfur type antioxidants include, for example, compounds such as di-n-dodecyl 3,3'-thiodipropionate, di-myristyl 3,3'-thiodipropionate, di-n-octadecyl 3,3'-thiodipropionate, 2-mercaptobenzoimidazole, pentaerythritol-tetrakis-(β-lauryl, urylthiopropionate), ditridecyl-3,3'-thiodipropionate, dimethyl 3,3'-thio dipropionate, octadecyl thioglycolate, phenothiazine, β,β'-thiodipropionic acid, n-butyl thioglycolate, ethyl thioglycolate, 2-ethylhexyl thioglycolate, isooctyl thioglycolate, n-octylthioglycolate, di-t-dodecyl-disulfide, n-butyl sulfide, di-n-amyl disulfide, n-dodecyl sulfide, n-octadecyl sulfide, p-thiocresol, etc.

The phenol type antioxidants include, for example, compounds such as 2,6-di-t-butyl-p-cresol (BHT), 2,6-di-t-butylphenol, 2,4-di-methyl-6-t-butylphenol, butylhydroxyphenol, 2,2'-methylenebis(4-methyl-6-t-butylphenol), 4,4'-thiobis(3-methyl-6-t-butylphenol), bisphenol A, DL-α-tocopherol, styrenated phenol, styrenated cresol, 3,5-di-t-butylhydroxy benzaldehyde, 2,6-di-t-butyl-4-hydroxymethylphenol, 2,6-di-s-butylphenol, 2,4-di-t-butylphenol, 3,5-di-t-butylphenol, o-n-butoxyphenol, o-t-butylphenol, m-t-butylphenol, p-t-butylphenol, o-isobutoxyphenol, o-n-propoxyphenol, o-cresol, 4,6-di-t-butyl-3-methylphenol, 2,6-dimethylphenol, 2,3,5,6-tetramethylphenol, stearyl 3-(3',5'-di-t-butyl-4'-hydroxyphenyl) propionate, 2,4,6-tri-t-butylphenol, 2,4,6-trimethylphenol, 2,4,6-tris(3',5'-di-t-butyl-4'-hydroxybenzyl) mesitylene, 1,6-hexanediol-bis[3-(3,5-di-t-butyl-4-hydroxyphenyl) propionate], 2,2-thio-diethylenebis[3-(3,5-di-t-butyl-4-hydroxyphenyl) propionate], 2,2-thiobis(4-methyl-6-t-butylphenol), 3,5-di-t-butyl-4-hydroxy-b enzyl phosphate, o-n-propoxyphenol, o-cresol, 4,6-di-t-butyl-3-methylphenol, 2,6-dimethylphenol, 2,3,5,6-tetramethylphenol, stearyl 3-(3',5'-di-t-butyl-4'-hydroxyphenyl) propionate, 2,4,6-tri-t-butylphenol, 2,4,6-trimethylphenol, 2,4,6-tris(3',5'-di-t-butyl-4'-hydroxybenzyl) mesitylene, 1,6-hexanediol-bis[3-(3,5-di-t-butyl-4-hydroxyphenyl) propionate], 2,2-thio-diethylenebis[3-(3,5-di-t-butyl-4-hydroxyphenyl) propionate], 2,2-thiobis(4-methyl-6-t-butylphenol), diethyl 3,5-di-t-butyl-4-hydroxy-benzylphosphate, 1,3,5-trimethyl-2,4,6-tris(3,5-di-t-butyl-4-hydroxylbenzyl benzene, n-octadecyl-3-(3',5-di-t-butyl-4-hydroxyphenyl) propionate, 2-t-butyl-6 (3'-t-butyl-5'-methyl-2-hydroxybenzyl)-4-methylphenyl acrylate, 4,4'-butylidene-bis(3-methyl-6-t-butylphenol), hydroquinone, 2,5-di-t-butyl hydroquinone, tetramethyl hydroquinone etc.

The hindered amine type antioxidants include, for example, compounds such as bis(2,2,6,6-tetramethyl-4-piperidyl) sebacate, bis(1,2,2,6,6-pentamethyl-4-piperidyl) sebacate, 1-{2-[3-(3,5-di-t-butyl-4-hydroxyphenyl)propionyloxy]ethyl}-4-(3,5-di-t-butyl-4-hydroxyphenyl) propionyloxy-2,2,6,6-tetramethylpyridine, 8-benzyl-7,7,9,9-tetramethyl-3-octyl-1,3,8-triazaspiro[4,5] undecane-2,4-dione, benzoyloxy-2,2,6,6-tetramethyl piperidine, 2,2,6,6-tetramethyl-4-piperidinol, tetrakis(2,2,6,6-tet-tetramethyl-4-piperidyl/decyl)-1,2,3,4-butane tetracarboxylate, etc.

These antioxidants may be used alone or as a mixture of two or more thereof.

Flame retardancy is regulated so as to exhibit resistance to flames applied onto the regulating surface. As the flame-retardant material, addition-type flame-retardants such as halogen type flame-retardant, phosphorus type flame-retardant and inorganic flame-retardant can be used.

The halogen type flame-retardant includes bromine type flame-retardants such as tetrabromobisphenol A (TBA), hexabromobenzene, decabromodiphenyl ether, tetrabromoethane (TBE), tetrabromobutane (TBB) and hexabromocyclodecane (HBCD) and chlorine type flame-retardants such as chlorinated paraffin, chlorinated polyphenyl, diphenyl chloride, perchloropentacyclodecane and chlorinated naphthalene, and these can be used in combination with antimony trioxide, to achieve a higher effect.

Typical examples of the phosphorus type flame-retardant include tricresyl phosphate, tri(β-chloroethyl) phosphate, tri(dichloropropyl) phosphate, tri(dibromopropyl) phosphate, 2,3-dibromopropyl-2,3-chloropropyl phosphate, etc.

The inorganic flame-retardant includes aluminum hydroxide, magnesium hydroxide phosphate or halogenated phosphates, hydrates of zirconium hydroxide, basic magnesium carbonate, dolomite, hydrotalcite, calcium hydroxide, barium hydroxide and tin oxide, hydrates of inorganic metal compounds such as borax, zinc borate, zinc metaborate, barium metaborate, zinc carbonate, calcium magnesium carbonate, calcium carbonate, barium carbonate, magnesium oxide, molybdenum oxide, zirconium oxide, tin oxide and red phosphorus, among which a hydrate of at least one metal compound selected from the group consisting of aluminum hydroxide, magnesium hydroxide, zirconium hydroxide, basic magnesium carbonate, dolomite and hydrotalcite, particularly aluminum hydroxide and magnesium hydroxide, is economically useful owing to its high flame-retardant effect.

The preferable particle diameter of the inorganic flame-retardant is varied depending on the type; for example, the average particle diameter of aluminum hydroxide or magnesium hydroxide is 20 μm or less, preferably 10 μm or less.

These flame-retardants may be used alone or as a mixture of two or more thereof.

When the halogen type flame-retardant or phosphorus type flame-retardant is selected as the flame-retardant material, the total amount of the flame-retardant incorporated is in a range of 5 to 50 parts by weight, more preferably in a range of 6 to 40 parts by weight, relative to 100 parts by weight of the resin. An amount outside of these ranges is problematic because if the amount of the flame-retardants is less than 5 parts by weight, high flame retardancy is hardly achieved, while an amount higher than 50 parts by weight does not improve flame retardancy so much and is thus uneconomical.

On the other hand, when the inorganic flame-retardant is selected as the flame-retardant material, the inorganic flame-retardant is incorporated preferably in a range of 30 to 200 parts by weight, more preferably in the range of 40 to 150 parts by weight, based on 100 parts by weight of the resin. When the amount of the inorganic flame-retardant is less than 30 parts by weight, the inorganic flame-retardant cannot achieve sufficient flame retardancy by itself, thus requiring simultaneous use of the organic flame-retardant. On the other hand, when the inorganic flame-retardant is compounded in an amount of higher than 200 parts by weight, the resultant resin is inferior in abrasion resistance, has reduced mechanical strength such as impact strength, and is free of flexibility and inferior in low-temperature characteristics.

The inorganic flame-retardant is particularly useful as the flame-retardant material because of its advantage of not generating toxic gas such as halogen gas upon combustion.

A polymer selected as the sheet retention improving material is free of a reactive double bond to be added for improvement of sheet handling (flexibility) and improvement of tack of a sheet surface and is excellent in compatibility with the compound having a double bond. For example, when the compound having a double bond has a urethane skeleton with a (meth)acryloyl group, an acryl resin made of methyl methacrylate, a polyester resin or an urethane resin can be used. There are criteria and SP (solubility parameter) for selection of the polymer, and a combination of materials similar in such values is preferable. As the polymer, fluorine resin, silicone resin etc. are also used in addition to those described above.

Polar groups such as hydroxyl group, amino group, carboxyl group, carbonyl group and epoxy group may be added to these polymers in order to improve adhesion of the gloss-regulating layer to the substrate 10 and compatibility with the sublayer protecting material. A peroxide can be added if necessary to the gloss-regulating layer. As the peroxide, a usual organic peroxide can be used, but for storage stability at ordinary temperatures, the peroxide is preferably an organic peroxide having a decomposition temperature of 100° C. or more.

Examples thereof include 2,2-bis(tert-butylperoxy) butane, tert-butylperoxy benzoate, di-tert-butylperoxy isophthalate, methyl ethyl ketone peroxide, dicumyl peroxide and tert-butyl peroxyacetate. The amount of the peroxide added is preferably in a range of 0.5 to 5.0 parts by weight relative to 100 parts by weight of the above-mentioned low-molecular compound having a (meth)acryloyl group. These peroxides may be used alone or in combination thereof. By adding these peroxides, a portion hardly cured by light irradiation can be thermally cured.

As the binder constituting the gloss-regulating layer, a water-soluble binder may be used in place of the resin described above. The water-soluble binder includes water-soluble polymers such as oxidized starch, phosphorylated starch, cationic starch, self-denatured starch and various kinds of modified starch, polyethylene oxide, polyacrylamide, sodium polyacrylate, sodium alginate, hydroxyethyl cellulose, methyl cellulose, polyvinyl alcohol or derivatives. These water-soluble polymers can be used as a mixture thereof depending on the purpose.

If necessary, a small amount of a coloring matter such as a pigment, dye etc., or fine particles of highly hard materials for increasing hardness are added to the gloss-regulating layer. As the coloring matter, a pigment and dye used in coatings can be used. The pigment includes titanium oxide, iron oxide, carbon black, cyanine type pigments and quinacridone type pigments. The dye includes azo type dyes, anthraquinone type dyes, indigoid type dyes and stilbene type dyes. Further, alumina flakes and metal powder such as nickel powder, gold powder and silver powder may be used as the coloring matter. The particles of these materials are preferably as fine as possible. As the material for increasing hardness, fine particles (volume average particle diameter: 20 nm or less) of titanium oxide, silica, diamond etc. are used if necessary. When these coloring matters are added, the photo-initiator is preferably the one initiating the reaction by lights of wavelengths less adsorbed by the coloring matters.

Hereinafter, a combination of mainly acrylic materials is shown below. The materials in other systems can also be similarly combined.

I: A photo-curable gloss-regulating layer based on (a) acryl resin having a weight average molecular weight of 20,000 to 1,000,000 and being solid at ordinary temperatures, (b) a low-molecular compound having a double bond in the molecule, and (c) a photo-initiator.

II: A photo-curable gloss-regulating layer based on (d) acryl resin having, in the molecule, a plurality of functional groups of at least one kind selected from the group consisting of a hydroxyl group, an amino group and a carboxyl group and having a weight average molecular weight of 20,000 to 1,000,000, (b) a low-molecular compound having a double bond in the molecule, (c) a photo-initiator, and (e) at least one kind of crosslinking agent selected from the group consisting of an isocyanate type crosslinking agent, a melamine type crosslinking agent and an epoxy type crosslinking agent.

III: A photo-curable gloss-regulating layer based on (f) acryl resin having a plurality of reactive double bonds in the molecule, having a weight average molecular weight of 20,000 to 1,000,000 and being solid at ordinary temperatures, (b) a low-molecular compound having a double bond in the molecule, and (c) a photo-initiator.

IV: A photo-curable gloss-regulating layer based on (g) acryl resin having, in the molecule, a plurality of reactive double bonds and a plurality of functional groups of at least one kind selected from the group consisting of a hydroxyl group, an amino group and a carboxyl group, having a weight average molecular weight of 20,000 to 1,000,000 and being solid at ordinary temperatures, (b) a low-molecular compound having a double bond in the molecule, (c) a photo-initiator, and (e) at least one kind of crosslinking agent selected from the group consisting of an isocyanate type crosslinking agent, a melamine type crosslinking agent and an epoxy type crosslinking agent.

For example, the electron radiation curing gloss-regulating layer makes use of the composition of the photo-curable gloss-regulating layer from which the photo-initiator is removed.

(a) Acryl resin having a weight average molecular weight of 20,000 to 1,000,000 and being solid at ordinary temperatures, shown in the composition of the gloss-regulating layer described above, can be obtained by copolymerizing (meth) acrylate such as methyl (meth)acrylate, ethyl (meth)acrylate or butyl (meth)acrylate with a styrene-derived monomer or a maleic acid type monomer in the presence of a reaction initiator (various peroxides, chain transfer agents etc.).

(d) Acryl resin having, in the molecule, a plurality of functional groups of at least one kind selected from the group consisting of a hydroxyl group, an amino group and a carboxyl group, having a weight average molecular weight of 20,000 to 1,000,000 and being solid at ordinary temperatures, shown in the composition of the gloss-regulating layer described above, can be obtained by copolymerizing e.g. a monomer having at least one kind of functional group, selected from a (meth) acrylate monomer having a carboxyl group, such as (meth)acrylate, a (meth)acrylate monomer having a hydroxyl group, such as 2-hydroxyethyl (meth) acrylate and 4-hydroxybutyl (meth) acrylate, and a (meth) acrylate monomer having an amino group, such as 2-aminoethyl (meth) acrylate and 3-aminopropyl (meth) acrylate, with another (meth)acrylate, a styrene-derived monomer or a maleic acid type monomer in the presence of a reaction initiator (various peroxides, chain transfer agents etc.).

(f) Acryl resin having a plurality of (meth)acryloyl groups in the molecule, having a weight average molecular weight of 20,000 to 1,000,000 and being solid at ordinary temperatures and (g) acryl resin having, in the molecule, a plurality of reactive double bonds and a plurality of functional groups of at least one kind selected from the group consisting of a hydroxyl group, an amino group and a carboxyl group, having a weight average molecular weight of 20,000 to 1,000,000 and being solid at ordinary temperatures, shown in the composition of the gloss-regulating layer described above, can be obtained by copolymerizing e.g. a monomer having at least one kind of functional group selected from (math)acrylic acid having a carboxyl group, such as (meth) acrylic acid; a (meth)acrylate monomer having a hydroxyl group, such as 2-hydroxyethyl (meth)acrylate and 4-hydroxybutyl (meth)acrylate; a (meth)acrylate monomer having an amino group, such as 2-aminoethyl (meth)acrylate and 3-aminopropyl (meth)acrylate; a (meth)acrylate monomer having aziridinyl, such as 2-(1-aziridinyl)ettyl(meth) acrylate and 2-(2-aziridinyl)butyl(meth)acrylate; and a (meth)acrylate monomer having an epoxy group, such as glycidyl (meth)acrylate, with another (meth)acrylate, a styrene-derived monomer or a maleic acid type monomer in the presence of a reaction initiator (various peroxides, chain transfer agents etc.), to produce an acrylic copolymer having functional groups, followed by adding a monomer having the above-described functional monomer to the acrylic copolymer.

The weight average molecular weight (Mw) of the acryl resins (a), (d), (f) and (g) can be changed depending on conditions for the polymerization reaction using a reaction initiator. The acryl resin used in the invention is preferably the one having a weight average molecular weight in a range of 20,000 to 1,000,000. When the weight average molecular weight is lower than 20,000, sufficient elongation cannot be achieved for stretching at the time of the operation of attaching the lamination film, and cracking may occur. When the weight average molecular weight is higher than 1,000,000, the resin is hardly dissolved in a solvent, thus making it difficult to produce the gloss-regulating layer from the photo-curable resin composition. For example, when the gloss-regulating layer is prepared by solvent casting, the solvent viscosity is increased so that the resin cannot be cast except at a low concentration, thus making it difficult to increase the thickness of the gloss-regulating layer.

From the relationship of hardness of the gloss-regulating layer after curing with mar resistance, the Tg (glass transition point) of the acryl resin is preferably in a range of −20° C. to 100° C. However, when the surface hardness is not so high, for example 2B or less (23° C.) in terms of pencil hardness, or when elongation of the gloss-regulating layer is scarcely required, the glass transition point may be outside of the above range. The acryl resin may be a combination of different kinds of acryl resins insofar as they have a molecular weight in the range defined above. The acryl resins (d) and (g) have functional groups such as hydroxyl group, amino group and carboxyl group and are thus crosslinked with the crosslinking agent, whereby the flexibility of the sheet can be improved.

The sum of the functional group values of the acryl resin (d) or (g) {OH value and $NH_2$ value ($NH_2$: the amount of $NH_2$ groups added at the time of polymerization is calculated in the same manner as for OH value, or quantified by converting the $NH_2$ groups into OH groups by reaction with nitrous acid) and COOH value (COOH value: the amount of COOH groups added at the time of polymerization is calculated in the same manner as for OH value, or quantified by titration of the COOH groups with KOH)} is preferably in a range of 2 to 50. When the functional group value is less than 2, an improvement in flexibility of the gloss-regulating layer may not be expected. On the other hand, when the functional group value is higher than 50, sufficient elongation of the gloss-regulating layer may not be achieved. However, when there is less need for elongation of the gloss-regulating layer or the flexibility of the gloss-regulating layer is sufficient, the functional group value may be outside of the above range.

These acryl resin materials can also be used as block copolymers wherein reactive moieties of the acryl resin are blocked or comb-shaped. In this case, the material used for blocking these reactive acryl resin materials may be any combinations of materials including not only acryl, styrene, maleic acid or imide type materials highly compatible with the acryl resin, but also silicone or fluorine type materials capable of blocking. In this case, there is a method of using these materials so as to attain a weight average molecular weight in the range defined above or a method of blending these block polymers with the reactive acryl resin.

(b) Low-molecular compound having a double bond in the molecule, shown in the composition of the gloss-regulating layer described above, includes e.g. monofunctional acrylates such as methyl (meth)acrylate, ethyl (meth)acrylate, benzyl (meth)acrylate, 2-ethoxyethyl (meth)acrylate and phenoxy diethylene glycol (meth)acrylate, and multifunctional acrylates such as 1,6-hexanediol di(meth)acrylate, neopentyl glycol di(meth)acrylate, polyethylene glycol di(meth)acrylate, polypropylene glycol di(meth)acrylate, trimethyl propane tri(meth)acrylate, pentaerythritol tri (meth)acrylate, pentaerythritol tetra(meth)acrylate and dipentaerythritol hexa(meth)acrylate.

Further, (b) low-molecular compound includes oligomers such as polyester acrylate, polyurethane acrylate, polyepoxy acrylate, polyether acrylate, oligoacrylate, polyalkyd acrylate, polyol acrylate etc. These low-molecular compounds may have functional groups such as hydroxyl group, amino group and carboxyl group.

The isocyanate type crosslinking agent in the item (e) above is an isocyanate compound having two or more isocyanate groups in the molecule, and examples thereof include monomers such as tolylene diisocyanate, diphenylmethane diisocyanate, naphthalene diisocyanate, trizine diisocyanate, triphenylmethane triisocyanate, tris(isocyanatephenyl)thiophosphite, p-phenylene diisocyanate, xylylene diisocyanate, bis(isocyanatemethyl)cyclohexane, dicyclohexylmethane diisocyanate, hexamethylenediisocyanate, lysinediisocyanate, hexamethylene diisocyanate and isophorone diisocyanate, or trimethylol propane adducts of these monomers, orisocyanurate-, burette-, carbodiimide-, urethane- or allophanate-modified derivatives thereof.

The melamine type crosslinking agent in the item (e) above refers to an etherified melamine resin produced by reacting, with an alcohol such as butyl alcohol or propyl alcohol, trimethylol melamine, hexamethylol melamine, dimethylol urea dimethylol guanidine, dimethylol acetoguanamine or dimethylol benzoguanamine obtained by reacting formaldehyde with a multifunctional material having an amino group, such as melamine, urea, thiourea, guanidine, guanamine, acetoguanamine, benzoguanamine, dicyan diamide or guanamine.

The epoxy type crosslinking agent in the item (e) above is a glycidyl compound of polyvalent alcohol containing a plurality of epoxy groups, and is used together with a Lewis acid catalyst. The Lewis acid is formed preferably into microcapsules in order to retard the reaction. Examples thereof include glycidyl compounds such as diglycidyl ester of butadiene dioxide, hexadiyne dioxide or phthalic acid, diglycidyl ether of bisphenol A, diglycidyl ether of bisphenol F, triglycidyl ether amine of p-aminophenol, diglycidyl ether of aniline, tetraglycidyl ether of phenylene diamine, diglycidyl ether of sulfonamide, and triglycidyl ether of glycerin, and polyether-modified diglycidyl, polyester-modified diglycidyl or urethane-modified diglycidyl compounds (polymers), and vinylcyclohexene dioxide, dicyclopentadiene dioxide etc.

The crosslinking agent is added preferably in such an amount that the functional group value of the acryl resin: functional group value of the crosslinking agent is about 1:0.7 to 1.3. However, the amount of the crosslinking agent is determined preferably by a preliminary experiment because the reaction of functional groups of the acryl resin or the crosslinking agents, for example, the reaction among the melamine type crosslinking agents, the reaction of the melamine type crosslinking agent with the epoxy crosslinking agent, etc. can occur depending on the reactivity of the crosslinking agent with the acryl resin used.

The fillers constituting the gloss-regulating layer are not limited; specifically, when composed of organic resin particles, the fillers include homopolymers or copolymers obtained by polymerizing one or more monomers selected from styrene or styrene derivatives such as vinyl styrene and chlorostyrene; monoolefins such as ethylene, propylene, butylene and isobutylene; vinyl esters such as vinyl acetate, vinyl propionate, vinyl benzoate and vinyl butyrate; α-unsaturated fatty monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; vinyl ketones such as vinyl methyl ketone, vinyl hexyl ketone and vinyl isopropenyl ketone; and diene type monomers such as isoprene and 2-chlorobutadiene.

Among these monomers, particularly styrene or derivatives thereof and α-unsaturated fatty monocarboxylates are preferably used, and when their hot-melt resin is to be used as fillers, the resin can be used as fillers constituting the gloss-regulating layer by coating the resin in a solvent in which it is not dissolved, and more preferably, a heat-curable resin having a crosslinked structure produced by adding a crosslinking agent etc. to such hot-melt resin or the above-described heat-curable resin, photo-curable resin or electron radiation curable resin is used in a pulverized form.

When the fillers constituting the gloss-regulating layer are composed of fine inorganic particles, examples of the fillers include mica, talc, silica, calcium carbonate, zinc white, halloysite clay, kaolin, basic magnesium carbonate, quartz powder, titanium dioxide, barium sulfate, calcium sulfate, alumina etc.

The fillers are generally in a spherical form, but may be in a plate, needle or indefinite form. The difference in refractive index between the fillers and the resin is preferably 0.01 or more, more preferably 0.1 or more, to regulate surface gloss.

The weight average particle diameter of the fillers is preferably 10 μm or less, particularly preferably 0.01 to 5 μm, in consideration of the thickness of the gloss-regulating layer.

The proportion by weight of the fillers and the binder (fillers:binder) in the gloss-regulating layer is preferably in a range of from 0.3:1 to 3:1, more preferably in a range of from 0.5:1 to 2:1. When the proportion of the fillers is in the range defined above, the gloss is hardly varied before and after image formation, but when the proportion of the fillers is lower than the range, the light scattering of the layer is lowered, while when the proportion is higher than the range, formation of the gloss-regulating layer is made difficult.

As the function-regulating means 20, the gloss-regulating layer has been described, and the function-regulating means 20 is arranged from the viewpoint of regulation of light resistance, microbial resistance, flame retardancy, releasability and chargeability as described above. That is, the function-regulating means is arranged on the other surface of the substrate 10 than where an image has been formed, so that after final lamination, the surface provided with the function-regulating means 20 is exposed to the outside, thus requiring not only light resistance but also releasability so as to remove, by wiping, water contacting with the surface of the film during use and regulation of chargeability so as to attain a surface resistance of $10^{12}$ $\Omega/cm^2$ or less thereby making adhesion of dust to the surface of the film difficult. Further, microbial resistance is desired for use in an image indicating material to be handled and viewed or displayed on a wall in the hospital. Further, flame retardancy for suppressing combustion upon heating at the time of fire or for preventing generation of poisonous gas is necessary.

The regulation of light resistance, microbial resistance, flame retardancy, releasability and chargeability can be carried out by using the materials and methods described in connection with the substrate, gloss-regulating layer etc. used in the invention.

The electrophotographic lamination film of the invention may be structured to have at least one coating layer as an image-receiving layer on the surface of the substrate 10 having a Vicat softening temperature in a range of 70 to 130° C. in order to form an excellent image. The image-receiving layer may be made of the same resin as in the gloss regulating layer described above, but in the invention, a hot-melt polyester resin is preferably used.

Generally, the polyester can be produced by reacting a polyvalent hydroxy compound with a polybasic carboxylic acid or a reactive acid derivative thereof. The polyvalent hydroxy compound constituting the polyester includes, for example, diols such as ethylene glycol, diethylene glycol, triethylene glycol, 1,2-propylene glycol, 1,3-propylene glycol, 1,4-butane diol and neopentyl glycol, but as the polyester used in the invention, ethylene glycol and neopentyl glycol are used particularly preferably.

The polybasic carboxylic acid includes, for example, malonic acid, succinic acid, adipic acid, sebacic acid, alkyl succinic acid, maleic acid, fumaric acid, mesaconic acid, citraconic acid, itaconic acid, glutaconic acid, cyclohexane dicarboxylic acid, isophthalic acid, terephthalic acid, other divalent carboxylic acids, but in the invention, isophthalic acid and terephthalic acid can be used particularly preferably for production, availability of the material, costs etc. Usually, phthalic acid has structural isomers i.e. isophthalic acid and terephthalic acid, and accordingly, the two isomers are inevitably mixed in almost equal amounts in the resultant polyester.

In the invention, the molar ratio of ethylene glycol and neopentyl glycol (ethylene glycol:neopentyl glycol) as the polyvalent hydroxy compounds is particularly preferably in a range of from 3:7 to 1:9.

The number average molecular weight of the polyester is preferably in a range of 12000 to 45000, more preferably in a range of 20000 to 30000. When the number average molecular weight is less than 12000, the softening point of the resultant resin is so low that the resin can be viscous at ordinary temperatures even if the molar ratio of ethylene glycol to neopentyl glycol is in the desired range. When the number average molecular weight is higher than 45000, the softening temperature is so high that the fixation of an image (toner) is deteriorated.

The coating layer preferably contains natural wax or synthetic wax which is a material poor in adhesion to the fixing member or a release agent such as a release resin, a reactive silicone compound or a modified silicone oil in order to prevent adhesion or sticking onto the fixing member during fixation of an image.

Examples of the wax include natural wax such as carnauba wax, beeswax, montan wax, paraffin wax and microcrystalline wax, and synthetic wax such as low-molecular polyethylene wax, low-molecular polyethylene oxide wax, low-molecular polypropylene wax, low-molecular polypropylene oxide wax, higher fatty acid wax, higher fatty ester wax and sazole wax, and these may be used alone or in combination thereof.

The release resin includes silicone resin, fluorine resin, or modified silicone resin of silicone resin with various kinds of resin, for example, polyester modified silicone resin, urethane modified silicone resin, acryl modified silicone resin, polyimide modified silicone resin, olefin modified silicone resin, ether modified silicone resin, alcohol modified silicone resin, fluorine modified silicone resin, amino modified silicone resin, mercapto modified silicone resin and carboxy modified silicone resin, as well as heat-curable silicone resin and photo-curable silicone resin.

The modified silicone resin has high affinity for a toner resin as the image forming material or for resin particles composed of the hot-melt resin in the invention, is suitably miscible and compatible with the resin, is miscible by melting with the resin, and is thus excellent in coloration of a pigment contained in the toner, and because of the releasability of the silicone resin, the electrophotographic lamination film is prevented from adhering to the fixing member at the time of heat melting.

In the invention, a reactive silane compound and modified silicone oil can be added to achieve lower adhesion. The reactive silane compound, while reacting with the coating resin, reacts with the modified silicone oil so that the two components function as a release agent superior to the silicone oil as a liquid lubricant, and are strongly fixed by curing reaction as the release agent in the coating layer, and the release agent will not removed even by mechanical abrasion or solvent extraction.

Like the resin particles composed of the hot-melt resin, the wax and the release resin may be allowed to be coexistent in a particle state, but are added preferably to the hot-melt resin and utilized after incorporation in a state dispersed in and compatible with the hot-melt resin.

In the electrophotographic lamination film having a coating layer on the surface thereof according to the invention, the surface resistance of at least the outermost coating layer should be in a range of $10^8$ to $10^{13}$ $\Omega/cm^2$, preferably in a range of $10^9$ to $10^{11}$ $\Omega/cm^2$. When the surface resistance is outside of the above range, there may arise inconveniences similar to those of the electrophotographic lamination film not having the coating layer.

By adding a polymer electroconductive agent, a surfactant and fine electroconductive metal oxide particles as charging regulators to the coating layer, the surface resistance of the coating layer can be in the above range. Further, a matting agent is added preferably for improving transferability.

As the surfactant, a surfactant such as the same quaternary ammonium salt applied for regulating the surface resistance of the substrate 10 can be used.

The fine electroconductive metal oxide particles include ZnO, TiO, $TiO_2$, $SnO_2$, $Al_2O_3$, $In_2O_3$, SiO, $SiO_2$, MgO, BaO and $MoO_3$. These materials may be used alone or as a mixture thereof. Other elements are preferably contained in these metal oxides; for example, Al, In etc. are preferably contained in (doped with) ZnO; Nb, Ta etc. in TiO; and Sb, Nb, halogen elements etc. in $SnO_2$. Among these materials, $SnO_2$ doped with Sb is particularly preferable because of high stability and less change in electrical conductance with time.

The resin having lubricating properties used in the matting agent includes polyolefins such as polyethylene and fluorine resins such as polyvinyl fluoride, polyvinylidene fluoride, and polytetrafluoroethylene (Teflon®). Specifically, low-molecular polyolefin wax (e.g., polyethylene wax, molecular weight 1000 to 5000), high-density polyethylene wax, paraffin or microcrystalline wax can be mentioned.

Examples of the fluorine resin include a polytetrafluoroethylene (PTFE) dispersion.

The volume average particle diameter of the matting agent in the resin is preferably in a range of 0.1 to 10 μm, particularly preferably in a range of 1 to 5 μm. The volume average particle diameter is preferably greater, but when the particle diameter is too great, the matting agent is removed from the coating layer to generate a phenomenon called "powder drop", and the surface is easily damaged by abrasion and its haze is increased.

The content of the matting agent is preferably 0.1 to 10% by weight, more preferably 0.5 to 5% by weight, based on the coating-forming resin.

The matting agent is preferably flat-shaped. A previously flat matting agent may be used, or a matting agent having a relatively low softening temperature may be applied onto the coloring matter-receiving layer and made flat by heating at the time of drying or by pressing under heating. Preferably, the matting agent is protruded convexly from the surface of the coating layer.

In addition to those described above, fine inorganic particles (for example, $SiO_2$, $Al_2O_3$, talc or kaolin) and bead-shaped plastic powder (for example, crosslinked PMMA, polycarbonate, polyethylene terephthalate or polystyrene) may be used in combination as the matting agent.

As described above, the friction of the surface of the lamination film should be reduced by a matting agent etc. to improve the transferability of the film, and in actual application, the stationary coefficient of friction of the film surface is preferably 2 or less, more preferably 1 or less. Further, the dynamic coefficient of friction of the film surface is preferably in a range of 0.2 to 1, more preferably in a range of 0.3 to 0.65.

In the electrophotographic lamination film having a coating layer on the surface thereof according to the invention, at least the outermost coating layer preferably contains an antimicrobial substance depending on the object. The material to be added is selected from those having stable dispersibility in the composition and not modified with light irradiation.

For example, the organic antimicrobial material includes materials such as thiocyanate compounds, rhodopropargyl derivatives, isothiazolinone derivatives, trihalomethylthio compounds, quaternary ammonium salts, biguanide compounds, aldehydes, phenols, benzimidazole derivatives, pyridine oxide, carvanilino, and diphenyl ethers.

The inorganic antimicrobial material includes those based on zeolite, silica gel, glass, calcium phosphate, zirconium phosphate, silicate, titanium oxide, zinc oxide etc.

The volume average particle diameter of the inorganic antimicrobial agent described above is preferably in a range of 0.1 to 10 μm, more preferably in a range of 0.3 to 5 μm. Preferably the antimicrobial agent is basically exposed to the surface of the coating layer. Accordingly, the volume average particle diameter of the antimicrobial agent used is selected depending on the thickness of the coating layer. When the volume average particle diameter is too large, the antimicrobial agent is removed from the coating layer to generate the phenomenon of "powder drop" to easily damage the surface of the film and to further increase the haze.

Further, the content of the antimicrobial agent in the coating layer is preferably in a range of 0.05 to 5% by weight, more preferably in a range of 0.1 to 3% by weight, based on the coating-forming resin.

The light resistant material, antimicrobial material, flame retardant material, release agent, charging regulator and matting agent added to the coating layer as the image-receiving layer have been described, and these additives may also be added to the gloss-regulating layer made of the resin, fillers etc. However, the matting agent is added to the gloss-regulating layer preferably in an amount of 0.1 to 10% by weight, more preferably 0.5 to 5% by weight, from the relationship thereof with the fillers. The volume average particle diameter of the matting agent added to the gloss-regulating layer is preferably in a range of 0.1 to 10 μm, particularly preferably in a range of 1 to 5 μm.

The image-receiving layer (coating layer) and the gloss-regulating layer can make use of various plastic additives such as a heat stabilizer, an oxidation stabilizer, a light stabilizer, a lubricant, a pigment, a plasticizer, a crosslinking agent, an impact resistance improver, an antimicrobial agent, a flame-retardant, a flame-retardant assist and an antistatic agent.

The image-receiving layer composed of at least a resin and fillers and the function-regulating layer as the function-regulating means 20 are formed on the surface of the substrate 10 in the following method.

Each of the layers can be formed by mixing at least a resin and fillers with an organic solvent or with etc., dispersing the mixture uniformly by sonication or a device such as a wave rotor, an attritor or a sand mill to prepare a coating solution and coating or impregnating the surface of the substrate 10 with the coating solution.

The coating or impregnating method includes methods known in the art, such as blade coating, (wire) bar coating, spray coating, dipping coating, bead coating, air knife coating, curtain coating and roll coating.

When both the gloss-regulating layer and the coating layer are formed by coating, the substrate may be coated first with either of the layers or simultaneously with both the layers.

The solvent used in preparation of the coating solution is preferably a good solvent dissolving the surface of the substrate 10. When such a good solvent is used, the binding of the substrate 10 to the coating layer is significantly improved. This is because when a poor solvent is used, there is a definite interface between the coating layer and the substrate 10 so that after lamination, the adhesion of the film to the substrate 10 is insufficient, while when a good solvent is used, there is no definite interface so that the surface of the substrate 10 is fused with the coating layer to achieve sufficiently high adhesion.

The good solvent for the surface of the substrate 10 has such solubility as to exert a certain influence on the substrate 10 upon contact of the solvent with the surface of the substrate 10 thereby causing the surface of the substrate 10 to be slightly corroded (e.g. slight fogging of the surface is observed after removal of the solvent) or more corroded.

In formation of the coating layer on the surface of the substrate 10, the coating solution may be air-dried, but easily dried by heat drying. As the drying method, a known method such as a method of placing the coating in an oven, passing it through an oven or contacting it with a heating roller is used. The gloss-regulating layer can also be formed in an analogous manner.

The thickness of the layer as the function-regulating means thus formed on the surface of the substrate 10 is preferably in a range of 0.1 to 20 μm, more preferably in a range of 1.0 to 10 μm.

The thickness of the coating layer is preferably in a range of 0.1 to 20 μm, more preferably in a range of 1.0 to 10 μm.

Now, a method wherein an image is formed by an electromagnetic system on an unprinted lamination film P having a function-regulating layer as the function-regulating means 20 and a coating layer as the image-receiving layer, obtained in the above method, is described.

Formation of an image on the unprinted lamination film P by the electromagnetic system involves uniformly charging the surface of an electrophotographic photoreceptor (image carrier) and then exposing the surface to light based on information on an image, to form an electrophotographic latent image corresponding to the exposure. Then, a toner is fed from a developing device to the electrophotographic latent image on the surface of the photoreceptor, whereby the electrophotographic latent image is visualized and developed (toner image is formed). Further, the formed toner image is transferred to the surface of the image-receiving layer of the unprinted lamination film P, and finally the toner is fixed on the surface of the image-recording layer by heating or pressurization, to form the image-recording material having the image formed thereon. The image recording material referred to herein is the electrophotographic lamination film of the invention.

The electrophotographic lamination film of the invention has the image-forming layer as the surface of the laminate, so that the image formed on the image-receiving layer on the surface of the unprinted lamination film P should be a reverse image (mirror image), and when an electrostatic latent image is formed on the surface of the photoreceptor, the information on the mirror image is provided preferably as the image information exposed to light on the surface of the photoreceptor.

By heating and pressurization at the time of fixing, the toner is fixed to the surface of the image-receiving layer, and simultaneously the toner is contacted with the fixing member, and thus when the toner is low-viscous or has highly affinity for the material of the fixing member, a part of the toner is transferred to the fixing member and remains on the fixing member to cause offset and deteriorate the fixing member, resulting in a reduction in the longevity of the fixing device. Accordingly, the electrophotographic lamination film to be used as the image recording material should attain sufficient fixation of the toner image and releasability of the toner from the fixing member.

However, the surface of the image-receiving layer used in the invention and the surface of the substrate 10 have good adhesion to the toner, and thus the toner is considerably fixed to the surface of the lamination film at a temperature lower than the temperature at which the toner is melted and made viscous. When the fixing temperature is made considerably higher than the melting temperature of the toner, the temperature of the lamination film may become significantly higher than the Vicat softening temperature of the substrate 10, to make the substrate 10 unusable because of shrinkage, wrinkles and significant deformation, or the lamination film may be stuck on the fixing member to reduce the longevity of the fixing device.

It is therefore preferable in the invention that the fixation of the toner image formed on the surface of the electrophotographic lamination film is conducted such that the temperature of the surface of the electrophotographic lamination film is lower than the melting temperature of the toner. In consideration of the melting temperature of the conventional toner, the fixation of the toner is conducted such that the temperature of the surface of the electrophotographic lamination film is preferably 130° C. or less, more preferably 110° C. or less.

Even when the fixation of the toner is conducted such that the temperature of the surface of the lamination film is 130° C. or less as described above, it is preferable for the reason described above that the surface temperature of the lamination film at the time of fixation is lower than the Vicat softening temperature of the substrate 10, or the surface temperature of the lamination film at the time of fixation can be similar to the softening temperature of the toner.

Even when fixation is carried under the conditions described above, thermal deformation can occur depending on the substrate 10. In this case, the stiffness of the lamination film is particularly decreased to cause the film to be easily stuck on a heating roll in the fixing device. In this case, it is preferable that the lamination film is laminated on paper etc. for compensating for the stiffness of the film in the fixing device, or the fixing device is modified/adjusted so as to contact a guide with the edge of the film.

On the other hand, the non-image portion of the electrophotographic lamination film of the invention is contacted with the fixing member at the time of fixation, thus requiring the same performance (e.g. releasability) as that of the toner.

In the invention, therefore, the image-recording layer comprising at least a hot-melt polyester resin is formed preferably on one surface of the substrate 10, and further the gloss-regulating layer (function-regulating means 20) preferably containing a resin such as hot-melt resin, heat-curable resin, photo-curable resin or electron radiation curable resin and fillers is formed preferably on the other surface of the lamination film than where an image is formed. Further, additives such as a release agent etc. are contained preferably in both the layers thereby preventing adhesion to the fixing member in the fixing step, and further a charging regulator can be added to maintain transferability in the electrophotographic system.

According to the invention, the function-regulating layer is arranged on at least one surface of the substrate 10, while a mirror image is formed on the other surface of the substrate 10, whereby the desired electrophotographic lamination film can be obtained.

The electrophotographic lamination film of the invention is a lamination film which is excellent in image qualities (color, gloss, shielding properties) necessary for printed materials of sophisticated design and in stability in repetition of the image-forming process, is free of image defects caused by flaws and foreign matter, and secures sufficient heat resistance and light resistance even in outdoor use. According to the invention, there can be provided an electrophotographic lamination film having the performance described above and free of offset even with an oil-less toner, a method of producing the same, and a method of forming an image by use of the same.

The electrophotographic lamination film of the invention can confer and/or improve various functions including not only gloss but also heat resistance, light resistance, humidity resistance, water repellency, abrasion resistance and mar resistance by arranging the function-regulating means 20 on the other surface of the substrate 10 than where an image is formed. The electrophotographic lamination film with these conferred and/or improved functions is for example an image-recording material (electrophotographic lamination film) having a reverse image formed on the back thereof and a silicone hard coating layer endowed with gloss regulation, light resistance, microbial resistance, flame retardancy, heat resistance, water repellency and abrasion resistance formed on the right surface thereof, and the electrophotographic lamination film is suitable as a print such as ID card or as an indication label. Further, the electrophotographic lamination film provided with the gloss-regulating layer on the surface thereof to suppress gloss can be used preferably as a film for ID card. Accordingly, the electrophotographic lamination film of the invention can be endowed with functions capable of coping with various applications.

EXAMPLES

Hereinafter, the present invention is described in more detail by reference to the Examples, but the invention is not limited thereto. In the Examples and Comparative Examples, the term "part" refers to "parts by weight".

Example 1

The electrophotographic lamination film (lamination film 1) of the invention is produced. Hereinafter, the respective steps of the process are described.

<Preparation of a Substrate, an Electrophotographic Lamination Film>

10 parts of a transparent polymer electroconductive agent (Irgastat P-22, manufactured by Ciba Specialty Chemicals Inc.) are mixed with 90 parts of a PETG resin (Eastar PETG6763, Vicat softening temperature 85° C., manufactured by Eastman Chemical Company), and the mixture is melt-kneaded at a temperature of 240° C. in a vented twin-screw extruder. Then, the mixture is extruded downward in the form of a molten film through a die and then cooled to 80° C. by contacting the film with the outer periphery of a cooling mandrel arranged in a straight line extending from the die, to give substrate 1 as a transparent film of 100.0 μm in thickness. The surface resistance of the substrate 1 is $2.8 \times 10^{10}$ Ω/cm$^2$, and the Vicat softening temperature is 78° C. By cutting it into a sheet of A4 size, a lamination film 1 is prepared.

<Evaluation of the Performance of the Electrophotographic Lamination Film>

The lamination film 1 (with no image formed thereon) is printed thereon with a color mirror image containing a solid image by a color copying DocuCentre Color 1250 modified machine (modified such that the surface temperature of the lamination film at the time of fixation is 95 to 100° C.) manufactured by Fuji Xerox Co., Ltd., to give the lamination film 1 having the image formed thereon.

The lamination film 1 is examined for transportability in the machine, the fixation of the image, the density of the image after printing, etc. Further, the light resistance of the formed image is evaluated, and as performance of the electrophotographic film, the adhesion thereof as a card is confirmed.

—Evaluation of Transportability—

The transportability of the produced lamination film 1 in the color copying machine is examined by determining the number of generated jams when 30 lamination films 1 are set by hand in a tray in the color copying DocuColor 1250 modified machine and then successively printed. ○ is given when the number of jams is 0; Δ, 1; and ×, 2 or more.

—Evaluation of Fixation—

Toner fixation is evaluated as follows: A commercial cellophane adhesive tape of 18 mm in width (Cellophane tape, manufactured by Nichiban Co., Ltd.) is attached by the electrophotographic device at a linear pressure of 300 g/cm onto a solid image having a density of about 1.8 fixed to the surface of the lamination film 1, and the cellophane tape is removed at a rate of 10 mm/sec. The fixation of the image is evaluated in terms of the ratio of the density of the image after removal of the cellophane tape to the density of the image before removal of the tape (referred to hereinafter as OD ratio) (OD ratio=density of the image after removal/density of the image before removal). The electromagnetic recording medium is generally required to have toner fixation of 0.8 or more in terms of OD ratio. In this evaluation, ◎is given when the OD ratio is 0.9 or more; ○, 0.8 or more to less than 0.9; and ×, less than 0.8.

—Evaluation of Image Density, Image Qualities—

The density of the solid image thereon is measured with an X-Rite 968 densitomer (X-Rite Co., Ltd.), and ○ is given when the density of the image is 1.5 or more; Δ, 1.3 or more and less than 1.5; and ×, less than 1.3.

For image qualities, an image is formed under high temperature and high humidity conditions (28° C., 80% RH, condition A), room temperature conditions (22° C., 50% RH, condition B) and low temperature and low humidity (15° C., 15% RH, condition C), and accurate printability (printing reproduction) is evaluated. ○ is given when there is no problem under any conditions, while × is given to the condition with a problem (e.g., A ×, C ×, etc.).

—Evaluation of Light Resistance—

The lamination film 1 is arranged in a light resistance testing machine (SUNTEST CPS+, manufactured by Toyo Seiki Seisaku-sho, Ltd.) such that the surface having the solid image formed thereon is directed downward, and the image is irradiated with a light at an intensity of 760 W/$m^2$ from a Xe lamp for 100 hours in an atmosphere at 63° C. The density of the image before and after the light resistance test is measured, and ◎is given when the difference in the density of the image is less than 0.1; ○, 0.1 to 0.5; Δ, 0.5 to 1.0; and ×, higher than 1.0.

—Lamination—

For evaluation of lamination, a white sheet of A4 size comprising A-PET as a core coated on both surfaces with PETG (Diakrail W2012, thickness 500 μm, manufactured by Mitsubishi Plastics, Inc.) is sandwiched between the lamination films 1 such that the image surface is contacted with the white sheet, and then they are laminated at 160° C. at a rate of 0.3 m/min. (5 mm/sec.) with a laminator (Lamipacker LPD3206 City, Fujipla Inc.).

In this evaluation, the interface between the white sheet and the lamination film 1 is provided with a cut with a cutter knife, and the lamination film is attempted to be removed from the sheet by separating them via the cut by hand. ◎is given when the lamination film is not removed; ○, when the lamination film is removed but torn off; Δ, when the lamination film is removed but the image on the removed film is disturbed and forgery thereof is considered difficult; and ×, other cases.

The results are shown collectively in Table 1.

Example 2

Substrate 2 is obtained in the same manner as in Example 1 except that 18 parts of a transparent polymer electroconductive agent (Irgastat P-18, manufactured by Ciba Specialty Chemicals Inc.) and 82 parts of a PETG resin (Eastar PETG6763, Vicat softening temperature 85° C., manufactured by Eastman Chemical Company) are used as materials of the substrate. The surface resistance of the substrate 2 is $8.5\times10^{12}$ Ω/$cm^2$, and the Vicat softening temperature is 75° C. By cutting it into a sheet of A4 size, a lamination film 2 is prepared.

The lamination film 2 is evaluated in the same manner as in Example 1, and the results are collectively shown in Table 1.

Example 3

Substrate 3 is obtained in the same manner as in Example 1 except that 7 parts of a transparent polymer electroconductive agent (Irgastat P-18, manufactured by Ciba Specialty Chemicals Inc.), 3 parts of a surfactant (Elegan 264WAX, manufactured by Nippon Oil & Fats Co., Ltd.) and 90 parts of an alloy resin of PETG and polycarbonate (Eastalloy DA003, Vicat softening temperature 118° C., manufactured by Eastman Chemical Company) are used as materials of the substrate. The surface resistance of the substrate 3 is $5.8\times10^{5}$ Ω/$cm^2$, and the Vicat softening temperature is 107° C. By cutting it into a sheet of A4 size, a lamination film 3 is prepared.

The lamination film 3 is evaluated in the same manner as in Example 1, and the results are collectively shown in Table 1.

Example 4

<Preparation of Substrate>

3 parts of a surfactant (Elegan 264WAX, manufactured by Nippon Oil & Fats Co., Ltd.) are mixed with 97 parts of an ABS resin (Stylac A3824, Vicat softening temperature 126° C., manufactured by Asahi Chemical Industry Co., Ltd.), to prepare a substrate 4 of 75 μm in thickness in the same manner as in Example 1. The surface resistance of the substrate 4 is $3.7\times10^{11}$ Ω/$cm^2$, and the Vicat softening temperature is 124° C.

<Preparation of Function-Regulating Coating Solution A-1>

10 parts of a silicone resin (SHC900, a solids content of 300 by weight, manufactured by GE Toshiba Silicones Co., Ltd.) as heat-curable resin, 0.05 part of fine polydimethyl siloxane particles (TP130, volume average particle diameter of 3 μm, manufactured by GE Toshiba Silicones Co., Ltd.) as fillers, 0.3 part of 2-(2-hydroxy-5-methylphenyl)-2H-benzotriazole (Sumisorb 200, manufactured by Sumitomo Chemical Co., Ltd.) as UV ray absorber and 0.3 part of a surfactant (Bionin B144V, manufactured by Takemoto Oil &

Fat Co., Ltd.) as a charging regulator are added to 60 parts of a mixed solvent of cyclohexanone/methyl ethyl ketone in the ratio of 20/80 by weight and stirred sufficiently to prepare a function-regulating coating solution A-1 endowed with a surface resistance-regulating function, light resistance and releasability.

<Preparation and Evaluation of an Electrophotographic Lamination Film>

The function-regulating coating solution A-1 is applied by a wire bar onto only one surface of the substrate 4 and dried at 100° C. for 1 minute, to form a function-regulating layer (function-regulating means) of 0.5 μm in thickness. By cutting this film into a sheet of A4 size, a lamination film 4 is obtained.

The lamination film 4 is printed with a mirror image on the surface other than the function-regulating layer and evaluated in the same manner as in Example 1. The evaluation results are collectively shown in Table 1.

Example 5

<Preparation of Substrate>

2.5 parts of a surfactant (Elegan A-2000SP, manufactured by Nippon Oil & Fats Co., Ltd.) ware mixed with 97.5 parts of a styrene resin (Asaflex 835, Vicat softening temperature 72° C., manufactured by Asahi Chemical Industry Co., Ltd.), to prepare a substrate 5 of 75 μm in thickness in the same manner as in Example 1. The surface resistance of the substrate 5 is $7.1\times10^{10}$ Ω/cm$^2$, and the Vicat softening temperature is 71° C.

<Preparation and Evaluation of an Electrophotographic Lamination Film>

The function-regulating coating solution A-1 used in Example 4 is applied onto only one surface of the substrate 5 by a wire bar and dried at 100° C. for 1 minute, to form a function-regulating layer of 0.5 μm in thickness. By cutting this film into a film of A4 size, a lamination film 5 is prepared.

The lamination film 5 is printed with an image on the other surface than the function-regulating layer and evaluated in the same manner as in Example 1. These results are collectively shown in Table 1.

Comparative Example 1

Substrate 6 is obtained in the same manner as in Example 1 except that 12.5 parts of a transparent polymer electroconductive agent (Irgastat P-18, manufactured by Ciba Specialty Chemicals Inc.) and 87.5 parts of a PETG resin (Eastar PETG6763, Vicat softening temperature 85° C., manufactured by Eastman Chemical Company) are used as materials of the substrate. The surface resistance of the substrate 6 is $1.0\times10^{14}$ Ω/cm$^2$, and the Vicat softening temperature is 80° C. By cutting it into a film of A4 size, a lamination film 6 is prepared.

The lamination film 6 is evaluated in the same manner as in Example 1, indicating that the lamination film is inferior in the transferability of an image forming material (toner), underwent reduction in the density of the image, and is poor in image qualities because of missing letters under low-temperature and low-humidity conditions. Further, the film caused a problem of jamming.

The evaluation results are shown collectively in Table 1.

Comparative Example 2

<Preparation of Coating Solution B-1>

10 parts of a polyester resin (Thermolac F-1, a solids content of 30o by weight in methyl ethyl ketone, manufactured by Soken Chemical & Engineering Co., Ltd.), 12 parts of fine particles of electroconductive ITO (Pastran ITO, manufactured by Mitsui Mining and Smelting Co., Ltd.), 7 parts of toluene and 3 parts of butanol are mixed and sufficiently stirred in a paint shaker to prepare a coating solution B-1.

<Preparation and Evaluation of an Electrophotographic Lamination Film>

The coating solution B-1 is applied by a wire bar onto both surfaces of a film comprising PET as a core provided on both surfaces with PETG layers (Merinex 342, Vicat softening temperature of the surface PETG, 85° C.; thickness, 100 μm, manufactured by DuPont K.K.) as substrate 7 and dried at 90° C. for 1 minute, to form a lamination film 7 provided with an antistatic layer of 0.5 μm in thickness. The surface resistance of the lamination film 7 is $1.0\times10^7$ Ω/cm$^2$. This film is used after cutting into a sheet of A4 size.

The lamination film 7 is evaluated in the same manner as in Example 1, to indicate poor image qualities with letters blurred at high temperature under high humidity.

The evaluation results are collectively shown in Table 1.

Comparative Example 3

Substrate 8 is obtained in the same manner as in Example 4 except that StaylacA4921 (Vicat softening temperature 138° C., manufactured by Asahi Chemical Industry Co., Ltd.) is used in place of the ABS resin in Example 4. The surface resistance of the substrate 8 is $4.8\times10^{11}$ Ω/cm$^2$, and the Vicat softening temperature is 135° C. By cutting this film into a sheet of A4 size, a lamination film 8 is obtained.

The lamination film 8 is evaluated in the same manner as in Example 4, to indicate poor fixation and lamination.

The evaluation results are collectively shown in Table 1.

Comparative Example 4

A lamination film 9 is obtained in the same manner as in Comparative Example 2 except that the coating solution B-1 is applied onto the surface of an ethylene-vinyl acetate copolymer film (Suntek EVA:EF1530, Vicat softening temperature, 66° C.; thickness, 100 μm, manufactured by Asahi Chemical Industry Co., Ltd.) as substrate 9. The surface resistance of the lamination film 9 is $1.8\times10^{11}$ Ω/cm$^2$.

The lamination film 9 is evaluated in the same manner as in Example 4, but the softening temperature of the film is so low that all samples are stuck on the fixing device in the color copying machine, and thus the lamination film having an image fixed thereon could not be obtained. Accordingly, the film could not be subjected to the subsequent evaluation.

The evaluation results are collectively shown in Table 1.

Comparative Example 5

An antioxidant-containing biaxially oriented PET film having a thickness of 100 μm (Lumirror 100X53, Vicat softening temperature 240° C., manufactured by Toray Industries, Inc.) is used as substrate 10. The surface resistance of the substrate 10 is $1.8\times10^{10}$ Ω/$cm^2$. By cutting the substrate 10 into a sheet of A4 size, a lamination film 10 is obtained.

The lamination film 10 is evaluated in the same manner as in Example 1, to indicate that the film is poor in fixation and light resistance and failed to be laminated (stuck).

The evaluation results are collectively shown in Table 1.

Example 6

<Preparation of Function-Regulating Coating Solution A-2>

10 parts of a polyester resin (Thermolac F-1, a solids content of 30% by weight in methyl ethyl ketone, manufactured by Soken Chemical & Engineering Co., Ltd.) as hot-melt resin, 9 parts of fine melamine-formaldehyde condensate particles (Eposter S, average particle diameter 0.3 μm, manufactured by Nippon Shokubai Co., Ltd.) as fillers, 0.2 part of a surfactant (Elegan 264 WAX, manufactured by Nippon Oil & Fats Co., Ltd.), 20 parts of methyl ethyl ketone and 10 parts of methyl isobutyl ketone are mixed and sufficiently stirred, to prepare a function-regulating coating solution A-2 for regulating surface gloss and surface resistance.

<Preparation of an Image-Receiving Coating Solution B-2>

3 parts of a polyester resin (Biron 200, manufactured by Toyobo Co., Ltd.) as hot-melt resin, 0.05 part of fine crosslinked methacrylate copolymer particles (MP-150, volume average particle diameter 5 μm, manufactured by Soken Chemical & Engineering Co., Ltd.) as a matting agent, 0.3 part of 2-(2-hydroxy-5-methylphenyl)-2H-benzotriazole (Sumisorb 200, manufactured by Sumitomo Chemical Co., Ltd.) as UV ray absorber and 0.1 part of a surfactant (Elegan 264WAX, manufactured by Nippon Oil & Fats Co., Ltd.) are added to a mixed solvent of 40 parts of methyl ethyl ketone and 5 parts of toluene, and the mixture is sufficiently mixed to prepare an image-receiving coating solution B-2.

<Preparation and Evaluation of an Electrophotographic Lamination Film>

The function-regulating coating solution A-2 is applied by a wire bar onto one surface of a polyester type alloy film (Torepaloy GN, Vicat softening temperature 80° C. and thickness 100 μm, manufactured by Toray Gosei Film Co., Ltd.) as substrate 11 and dried at 90° C. for 1 minute, to form a function-regulating layer of 1 μm in thickness for regulating gloss. Further, the image-receiving coating layer B-2 is applied onto the uncoated surface (other than the above coating layer) of the substrate 11 and dried at 90° C. for 1 minute to form an image-receiving layer (coating layer) of 1 μm in thickness, to prepare a lamination film 11.

The surface resistance of the lamination film 11 is $1.0\times10^{13}$ Ω/$cm^2$ at the surface of the function-regulating layer and $2.0\times10^{11}$ Ω/$cm^2$ at the surface of the image-receiving layer. This film is used after cutting into a sheet of A4 size.

The lamination film 11 is printed with a mirror image on the surface of the image-receiving layer (i.e. on the surface other than the function-regulating layer) and evaluated in the same manner as in Example 1.

The evaluation results are collectively shown in Table 1.

Example 7

<Preparation of Function-Regulating Coating Solution A-3>

10 parts of a silicone resin (SI Coat 801, a solids content of 30% by weight, manufactured by GE Toshiba Silicones Co., Ltd.) as hot-melt resin, 0.4 part of fine polydimethyl siloxane particles (TP145, average particle diameter 4.5 μm, manufactured by GE Toshiba Silicones Co., Ltd.) as fillers, 0.2 part of a surfactant (Pionin B144V, manufactured by Takemoto Oil & Fat Co., Ltd.), 0.3 part of 2-(2-hydroxy-5-methylphenyl)-2H-benzotriazole (Sumisorb 200, manufactured by Sumitomo Chemical Co., Ltd.) as UV ray absorber and 0.03 part of a calcium phosphate-based inorganic antimicrobial agent carrying silver (Apacider AW, manufactured by Sangi Co., Ltd.) as an antimicrobial agent are added to 30 parts of cyclohexanone/methyl ethyl ketone in the ratio of 25/75 by weight, and the mixture is stirred sufficiently to prepare a function-regulating coating solution A-3 for regulating releasability, surface resistance and light resistance.

<Preparation of an Image-Receiving Coating Solution B-3>

10 parts of an aqueous polyester resin (Bironal MD-1900, a solids content of 30% by weight, manufactured by Toyobo Co., Ltd.), 0.05 part of fine crosslinked methacrylate copolymer particles (MP-180, volume average particle diameter 8 μm, manufactured by Soken Chemical & Engineering Co., Ltd.) as a matting agent and 0.1 part of a surfactant (Elegan 264WAX, manufactured by Nippon Oil & Fats Co., Ltd.) are added to 45 parts of distilled water as solvent to prepare an image-receiving coating solution B-3.

<Preparation and Evaluation of an Electrophotographic Lamination Film>

The function-regulating coating solution A-3 is applied by a wire bar onto one surface of a film comprising polycarbonate as a core coated on both surfaces with PETG (Diafix, Vicat softening temperature 86° C. and thickness 100 μm, manufactured by Mitsubishi Plastics, Inc.) as substrate 12 and dried at 90° C. for 1 minute, to form a function-regulating layer of 1 μm in thickness for regulating surface resistance and releasability. Further, the image-receiving coating layer B-3 is applied onto the uncoated surface (other than the above coating layer) of the substrate 12 and dried at 90° C. for 1 minute to form an image-receiving layer (coating layer) of 1 tm in thickness, to prepare a lamination film 12.

The surface resistance of the lamination film 12 is $4.4\times10^{12}$ Ω/$cm^2$ at the surface of the function-regulating layer and $2.0\times10^{11}$ Ω/$cm^2$ at the surface of the image-receiving layer. This film is used after cutting into a sheet of A4 size.

The lamination film 12 is printed with a mirror image on the surface of the image-receiving layer (i.e. on the surface other than the function-regulating layer) and evaluated in the same manner as in Example 1.

The evaluation results are collectively shown in Table 1.

In evaluation of microbial resistance, the film is evaluated for the presence of *E. coli* and *Staphylococcus aureus* by a film adhesion method according to "Kokinseihin Gijyutsu Kyokai" (Society of Industrial Technology for Antimicrobial Articles). As can be seen shown from Table 2, the number of viable microorganisms after 24 hours is very low, indicating that the effect of microbial resistance is sufficiently demonstrated.

Example 8

<Preparation of Function-Regulating Coating Solution A-4>

A surfactant (Elegan TOF4530, manufactured by Nippon Oil & Fats Co., Ltd.) is diluted 30-fold with distilled water, to prepare a surface resistance function-regulating coating solution A-4.

<Preparation of an Image-Receiving Coating Solution B-4>

10 parts of a polyester resin (Foret FF-4, a solids content of 30% by weight, manufactured by Soken Chemical & Engineering Co., Ltd.), 0.05 part of fine crosslinked methacrylate copolymer (polydimethyl methacrylate) particles (MP-1000, volume average particle diameter 10 μm, manufactured by Soken Chemical & Engineering Co., Ltd.) as a matting agent, 0.5 part of 2-(2-hydroxy-5-methylphenyl)-2H-benzotriazole (Sumisorb 200, manufactured by Sumitomo Chemical Co., Ltd.) as UV ray absorber, 0.1 part of an antioxidant (Chelex-500, manufactured by Sakai Chemical Industry Co., Ltd.), 0.2 part of a surfactant (Elegan 264WAX, manufactured by Nippon Oil & Fats Co., Ltd.) and 0.6 part of perchloropentacyclodecane as a flame-retardant are added to a mixed solvent of 10 parts of toluene and 30 parts of methyl ethyl ketone, and the mixture is sufficiently mixed to prepare an image-receiving coating solution B-4.

<Preparation and Evaluation of an Electrophotographic Lamination Film>

The function-regulating coating solution A-4 is applied by a wire bar onto one surface of a polyester type alloy film (Torepaloy UN, Vicat softening temperature 120° C. and thickness 100 μm, manufactured by Toray Gosei Film Co., Ltd.) as substrate 13 and dried at 100° C. for 1 minute, to form a function-regulating layer for regulating surface resistance. Further, the image-receiving coating layer B-3 is applied onto the uncoated surface other than the above coating layer and dried at 90° C. for 1 minute to form an image-receiving layer of 1 μm in thickness, to prepare a lamination film 13.

The surface resistance of the lamination film 13 is $6.7\times10^9$ $\Omega/cm^2$ at the surface of the function-regulating layer and $7.2\times10^9$ $\Omega/cm^2$ at the surface of the image-receiving layer. This film is used after cutting into a sheet of A4 size.

The lamination film 13 is printed with a mirror image on the surface of the image-receiving layer (i.e. on the surface other than the function-regulating layer) and evaluated in the same manner as in Example 1.

The evaluation results are collectively shown in Table 1.

For evaluation of flame retardancy, the following burning test is carried out. The lamination film of 60 mm in width and 150 mm in length is used as a sample, and this sample is attached to a U-shaped retainer, arranged horizontally and ignited. ○ is given when self-extinction occurred within 10 seconds; Δ, when self-extinction occurred within 20 seconds; and ×, when self-extinction did not occur within 20 seconds. As a result, the lamination film 13 in Example 8 is extinguished in almost 10 seconds by itself and judged to be ○.

Example 9

<Preparation and Evaluation of an Electrophotographic Lamination Film>

The image-receiving coating solution B-4 used in Example 8 is applied by a wire bar onto both surfaces of a film comprising PET as a core provided on both surfaces with PETG layers (Merinex 342, Vicat softening temperature of the surface PETG, 85° C.; thickness, 100 μm, manufactured by DuPont K.K.) as substrate 14 and dried at 90° C. for 1 minute, to form a lamination film 14 provided with an image-receiving layer of 2.0 μm in thickness.

The surface resistance of the lamination film 14 is $5.8\times10^9$ $\Omega/cm^2$. This film is used after cutting into a sheet of A4 size.

The lamination film 14 is printed with a mirror image on the surface of the image-receiving layer (i.e. on the surface other than the function-regulating layer) and evaluated in the same manner as in Example 1.

The evaluation results are collectively shown in Table 1. The lamination film is evaluated in the same burning test as in Example 8, and as a result, it is extinguished in 8 seconds by itself and judged to be ○.

Example 10

<Preparation of an Image-Receiving Coating Solution B-5>

30 parts of a polyester resin (Thermolac F-1, a solids content of 30% by weight, manufactured by Soken Chemical & Engineering Co., Ltd.), 0.15 part of fine crosslinked methacrylate copolymer particles (MP-1000, volume average particle diameter of 10 μm, manufactured by Soken Chemical & Engineering Co., Ltd.) as a matting agent, 0.6 part of a surfactant (Elegan 264WAX, manufactured by Nippon Oil & Fats Co., Ltd.) and 0.03 part of a zirconium phosphate-based inorganic antimicrobial agent carrying silver (Novalon AG300, manufactured by Toagosei Co., Ltd.) are added to a mixed solvent of 30 parts of toluene and 90 parts of methyl ethyl ketone and sufficiently mixed to prepare an image-receiving coating solution B-5.

<Preparation and Evaluation of an Electrophotographic Lamination Film>

The image-receiving coating solution B-5 is applied by a wire bar onto both surfaces of an alloy film of PETG and polycarbonate (Eastar PCTG Copolyester 5445, Vicat softening temperature 86° C. and thickness 100 μm, manufactured by Eastman Chemical Company) as substrate 15 and dried at 90° C. for 1 minute to form an image-receiving layer of 2 μm in thickness, to prepare a lamination film 15. The surface resistance of the lamination film 15 is $8.3\times10^9$ $\Omega/cm^2$. This film is used after cutting into a sheet of A4 size.

The lamination film 15 is printed with a mirror image on the surface of the image-receiving layer and evaluated in the same manner as in Example 1.

The evaluation results are collectively shown in Table 1.

The antimicrobial resistance of the lamination film 15 is evaluated by examining *E. coli* and *Staphylococcus aureus* by the same film adhesion method of "Kokinseihin Gijyutsu Kyokai" as in Example 7. As can be seen shown from Table 2, the number of viable microorganisms after 24 hours is very low, indicating that the effect of microbial resistance is sufficiently demonstrated.

Example 11

The image-receiving coating solution B-4 used in Example 8 is applied by a wire bar onto both surfaces of the substrate 4 used in Example 4 and dried at 90° C. for 1 minute to form an image-receiving layer of 2.0 μm in thickness, to prepare a lamination film 16.

The surface resistance of the lamination film 16 is $6.7\times10^9$ $\Omega/cm^2$. This film is used after cutting into a sheet of A4 size.

The lamination film 16 is printed with a mirror image on the surface of the image-receiving layer and evaluated in the same manner as in Example 1.

The evaluation results are collectively shown in Table 1.

Example 12

The image-receiving coating solution B-5 used in Example 10 is applied by micro-gravure coating onto both surfaces of the substrate 5 used in Example 5 and dried at 90° C. for 1 minute to form an image-receiving layer of 2.0 μm in thickness, to prepare a lamination film 17.

The surface resistance of the lamination film 17 is $9.1\times10^9$ $\Omega/cm^2$. This film is used after cutting into a sheet of A4 size.

The lamination film 17 is printed with a mirror image on the surface of the image-receiving layer and evaluated in the same manner as in Example 1.

The evaluation results are collectively shown in Table 1.

Comparative Example 6

The image-receiving coating solution B-4 used in Example 8 is applied by micro-gravure coating onto both surfaces of the PET film as substrate 10 used in Comparative Example 5 and dried at 90° C. for 1 minute to form an image-receiving layer of 2.0 μm in thickness, to prepare a lamination film 18.

The surface resistance of the lamination film 18 is $6.3\times10^9$ $\Omega/cm^2$. This film is used after cutting into a sheet of A4 size.

The lamination film 18 is printed with a mirror image on the surface of the image-receiving layer (i.e. on the surface other than the function-regulating layer) and evaluated in the same manner as in Example 1, indicating that the adhesion of the image-receiving layer to the PET film after lamination is insufficient so that the PET film can be completely separated in such a state as to permit forgery.

The evaluation results are collectively shown in Table 1.

Comparative Example 7

The image-receiving coating solution B-5 prepared in Example 10 is applied onto both surfaces of a triacetate film (Fuji Tack FT, Vicat softening temperature 272° C. and thickness 100 μm, manufactured by Fuji Film Co., Ltd.) as substrate 19 and dried at 90° C. for 1 minute to form an image-receiving layer of 2.0 μm in thickness, to prepare a lamination film 19.

The surface resistance of the lamination film 19 is $1.3\times10^{10}$ $\Omega/cm^2$. This film is used after cutting into a sheet of A4 size.

The lamination film 19 is printed with a mirror image on the image-receiving layer on one surface of the substrate and evaluated in the same manner as in Example 1, indicating that the adhesion of the image-receiving layer to the triacetate film after lamination is insufficient so that the triacetate film can be separated completely in such a state to permit forgery.

The evaluation results are collectively shown in Table 1.

TABLE 1

| | Transport-ability | Fix-ation | Image density | Image qualities | Light resistance | Lam-ination |
|---|---|---|---|---|---|---|
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ◎ | ○ |
| Example 5 | ○ | ○ | ○ | ○ | ◎ | ○ |
| Compara-tive Ex-ample 1 | X | ○ | Δ | CX | ○ | ○ |
| Compara-tive Ex-ample 2 | Δ | ○ | ○ | AX | Δ | ○ |
| Compara-tive Ex-ample 3 | ○ | X | ○ | ○ | ○ | X |
| Compara-tive Ex-ample 4 | X | — | — | — | — | — |
| Compara-tive Ex-ample 5 | Δ | X | ○ | ○ | Δ | X |
| Example 6 | ○ | ◎ | ○ | ○ | ○ | ◎ |
| Example 7 | ○ | ◎ | ○ | ○ | ◎ | ○ |
| Example 8 | ○ | ◎ | ◎ | ○ | ◎ | ◎ |
| Example 9 | ○ | ◎ | ◎ | ○ | ◎ | ◎ |
| Example 10 | ○ | ◎ | ◎ | ○ | ○ | ◎ |
| Example 11 | ○ | ◎ | ◎ | ○ | ◎ | ◎ |
| Example 12 | ○ | ◎ | ◎ | ○ | ○ | ◎ |
| Compara-tive Ex-ample 6 | ○ | ◎ | ◎ | ○ | ◎ | X |
| Compara-tive Ex-ample 7 | ○ | ○ | ◎ | ○ | ◎ | X |

TABLE 2

| | Microorganism | Test specimen | Number of initially added microorganisms | Number of viable microorganisms (after 24 hours) |
|---|---|---|---|---|
| Example 7 | *E. coli* | lamination film 12 | $2.5\times10^5$ | <10 |
| | | blank | | $4.5\times10^5$ |
| | | control | | $4.8\times10^5$ |

TABLE 2-continued

| | Microorganism | Test specimen | Number of initially added microorganisms | Number of viable microorganisms (after 24 hours) |
|---|---|---|---|---|
| | *Staphylococcus aureus* | lamination film 12 | $4.1 \times 10^5$ | <10 |
| | | blank | | $8.9 \times 10^6$ |
| | | control | | $8.5 \times 10^5$ |
| Example 10 | *E. coli* | lamination film 15 | $2.7 \times 10^5$ | <10 |
| | | blank | | $1.5 \times 10^7$ |
| | | control | | $1.8 \times 10^7$ |
| | *Staphylococcus aureus* | lamination film 15 | $3.3 \times 10^5$ | <10 |
| | | blank | | $1.4 \times 10^6$ |
| | | control | | $9.5 \times 10^5$ |

As can be seen from Table 1, the electrophotographic lamination films in Examples 1 to 12 exhibit sufficient fixation, image density higher than a predetermined level, light resistance and lamination. Further, the electrophotographic lamination films in Examples 7 and 10 can be seen to have sufficient microbial resistance. The electrophotographic lamination films in Examples 8 and 9 can be seen to have flame retardancy. By comparing the electrophotographic lamination films in Examples 9 and 11 with the electrophotographic lamination film in Comparative Example 6, the difference in the solubility of the surface of the film substrate with the solvent is recognized to bring about a significant difference in lamination.

According to the invention, the electrophotographic lamination film can be easily produced, and an image of high qualities having sufficient light resistance can be formed with good recognizability on the surface of the electrophotographic lamination film even when used outdoors. According to the invention, the electrophotographic lamination film can have functions capable of dealing with various applications by arranging the function-regulating means on the other surface of the substrate than where an image is formed.

What is claimed is:

1. An electrophotographic lamination film to be used for lamination onto another member, comprising a substrate, wherein a surface resistance of at least one surface of the substrate is in a range of $10^8$ to $10^{13}$ Ω/□, and a Vicat softening temperature of the substrate is in a range of 70 to 130° C., wherein the Vicat softening temperature range enables the substrate to adhere to an image forming material or a coating layer when laminated but does not soften to generate flow of the image forming material or coating layer.

2. An electrophotographic lamination film according to claim 1 comprising function-regulating means disposed on a surface of the substrate opposite a surface of the substrate at which an image is formed, wherein the function-regulating means has at least one function selected from regulating gloss, light resistance, microbial resistance, flame retardancy, releasability and chargeability.

3. An electrophotographic lamination film according to claim 1, wherein the substrate is transparent.

4. An electrophotographic lamination film according to claim 1, wherein the substrate comprises a resin having a chlorine-free resin as a main component thereof.

5. An electrophotographic lamination film to be used for lamination onto another member, comprising a substrate and at least one coating layer disposed on a surface of the substrate, wherein a surface resistance of at least an outermost surface of the at least one coating layer is in a range of $10^8$ to $10^{13}$ Ω/□, and a Vicat softening temperature of the substrate is in a range of 70 to 130° C., wherein the Vicat softening temperature range enables the substrate to adhere to the coating layer when laminated but does not soften to generate flow of the coating layer.

6. An electrophotographic lamination film according to claim 5, wherein the at least one coating layer comprises an image-receiving layer containing a resin and fillers.

7. An electrophotographic lamination film according to claim 6, wherein the resin contained in the image-receiving layer is a polyester resin.

8. An electrophotographic lamination film according to claim 5, wherein the at least one coating layer contains at least one selected from the group consisting of a charging regulator, an antimicrobial agent, a UV ray absorber and an antioxidant.

9. An electrophotographic lamination film according to claim 5, wherein the substrate is transparent.

10. An electrophotographic lamination film according to claim 5, wherein the substrate comprises a resin having a chlorine free resin as a main component thereof.

11. An electrophotographic lamination film according to claim 5 comprising function-regulating means disposed on a surface of the substrate opposite a surface of the substrate at which an image is formed, wherein the function-regulating means has at least one function selected from regulating gloss, light resistance, microbial resistance, flame retardancy, releasability and chargeability.

12. A method of forming an image by using an electrophotographic lamination film to be used for lamination onto another member, in which a surface resistance of at least one surface of a substrate is in a range of $10^8$ to $10^{13}$ Ω/□ and a Vicat softening temperature of the substrate is in a range of 70 to 130° C., and a toner image formed on a surface of the electrophotographic lamination film is formed as a mirror image such that an image-forming surface is a laminated surface, wherein the Vicat softening temperature range enables the substrate to adhere to the toner image when laminated but does not soften to generate flow of the toner image.

13. A method of forming an image according to claim 12, wherein fixation of the toner image formed on the surface of the electrophotographic lamination film is conducted such that a temperature of the surface of the electrophotographic lamination film is 130° C. or less.

14. A method of forming an image by using an electrophotographic lamination film to be used for lamination onto another member, comprising a substrate and at least one coating layer disposed on a surface of substrate wherein a surface resistance of at least an outermost surface of the at least one coating layer is in a range of $10^8$ to $10^{13}$ Ω/□ and a Vicat softening temperature of the substrate is in a range of 70 to 130° C., and a toner image formed on a surface of the electrophotographic lamination film is formed as a mirror image such that an image-forming surface is a laminated surface, wherein the Vicat softening temperature range enables the substrate to adhere to the toner image when laminated but does not soften to generate flow of the toner image.

15. A method of forming an image according to claim 14, wherein fixation of the toner image formed on the surface of the electrophotographic lamination film is conducted such that a temperature of the surface of the electrophotographic lamination film is 130° C. or less.

16. An image forming device comprising an electrophotographic photoreceptor, a charging unit for charging the photoreceptor, a latent image-forming device for forming an electrostatic latent image on the charged photoreceptor, a development device for developing the latent image with a toner, and a transfer device for transferring the toner image formed on the photoreceptor onto a recording medium, wherein the recording medium is an electrophotographic lamination film to be used for lamination onto another member, in which a surface resistance of at least one surface of a substrate is in a range of $10^8$ to $10^{13}$ Ω/□ and a Vicat softening temperature of the substrate is in a range of 70 to 130° C., and the toner image formed on a surface of the electrophotographic lamination film is formed as a mirror image such that an image-forming surface is a laminated surface, wherein the Vicat softening temperature range enables the substrate to adhere to the toner image when laminated but does not soften to generate flow of the toner image.

17. An image forming device according to claim 16, wherein fixation of the toner image formed on the surface of the electrophotographic lamination film is conducted such that a temperature of the surface of the electrophotographic lamination film is 130° C. or less.

18. An image forming device comprising an electrophotographic photoreceptor, a charging unit for charging the photoreceptor, a latent image-forming device for forming an electrostatic latent image on the charged photoreceptor, a development device for developing the latent image with a toner, and a transfer device for transferring the toner image formed on the photoreceptor onto a recording medium, wherein the recording medium is an electrophotographic lamination film to be used for lamination onto another member, comprising a substrate and at least one coating layer disposed on a surface of the substrate wherein a surface resistance of at least an outermost surface of the at least one coating layer is in a range of $10^8$ to $10^{13}$ Ω/□ and a Vicat softening temperature of the substrate is in a range of 70 to 130° C., and the toner image formed on a surface of the electrophotographic lamination film is formed as a mirror image such that an image-forming surface is a laminated surface, wherein the Vicat softening temperature range enables the substrate to adhere to the toner image when laminated but does not soften to generate flow of the toner image.

19. An image forming device according to claim 18, wherein fixation of the toner image formed on the surface of the electrophotographic lamination film is conducted such that a temperature of the surface of the electrophotographic lamination film is 130° C. or less.

20. An electrophotographic lamination film to be used for lamination onto another member, comprising a substrate, wherein a surface resistance of one of at least one surface of the substrate and at least an outermost surface of at least one coating layer disposed on a surface of the substrate is in a range of about $10^8$ Ω/□ to about $10^{13}$ Ω/□, and a Vicat softening temperature of the substrate is in a range of about 70° C. to about 130° C., wherein the Vicat softening temperature range enables the substrate to adhere to the coating layer when laminated but does not soften to generate flow of the coating layer.

* * * * *